United States Patent [19]

Shiraishi

[11] Patent Number: 5,502,802
[45] Date of Patent: Mar. 26, 1996

[54] POLYGONAL IMAGE-DRAWING PROCESSOR

[75] Inventor: Naoto Shiraishi, Minoo, Japan

[73] Assignee: Ricoh Company, Ltd., Tokyo, Japan

[21] Appl. No.: 502,466

[22] Filed: Jul. 14, 1995

Related U.S. Application Data

[63] Continuation of Ser. No. 932,357, Aug. 19, 1992, abandoned, which is a continuation-in-part of Ser. No. 727,832, Jul. 9, 1991.

[30] Foreign Application Priority Data

Jul. 27, 1990 [JP] Japan .................. 2-199816

[51] Int. Cl.$^6$ .................. G06F 15/00
[52] U.S. Cl. .................. 395/143
[58] Field of Search .................. 395/133, 137, 395/138, 141, 142, 143; 345/121, 126

[56] References Cited

U.S. PATENT DOCUMENTS

| | | | |
|---|---|---|---|
| 4,829,295 | 5/1989 | Hiroyuki | 340/728 |
| 4,852,020 | 7/1989 | Morita | 364/521 |
| 5,115,402 | 5/1992 | Matsushiro et al. | 395/141 |
| 5,133,049 | 7/1992 | Cain et al. | 395/133 |
| 5,179,645 | 1/1993 | Tanimori | 395/141 |
| 5,237,649 | 8/1993 | Yamada | 395/142 |
| 5,303,340 | 4/1994 | Gonzalez-Lopez et al. | 395/141 |

*Primary Examiner*—Phu K. Nguyen
*Attorney, Agent, or Firm*—Cooper & Dunham

[57] ABSTRACT

A polygonal image-drawing processor has a device for providing a direction of a linear vector on each of sides constituting a polygon based on information about two end points X and Y and side information of the polygon; a device for dividing each of the polygonal sides into two groups of right-handed and left-handed sides in accordance with the provided direction of the linear vector; a device for calculating an X address of each of dots between the two end points by a digital differential analysis with respect to a direction of a Y-coordinate; a device for controlling the operation of an image memory in a writing region thereof corresponding to each of the divided groups to write X and Y addresses at left-handed and right-handed intersection points of the polygon to the image memory; and an image-drawing processing device for performing a coloring operation between the respective right-handed and left-handed sides based on the X and Y addresses written to the image memory so as to draw an image. Another polygonal image-drawing processor is also shown.

7 Claims, 35 Drawing Sheets

Fig. 5

| horizontal scanning line | left-handed intersection point of polygon 1 | right-handed intersection point of polygon 1 | --- | right-handed intersection point of polygon n |
|---|---|---|---|---|
| horizontal scanning line 1 Y-address | X-address at image-drawing starting point | X-address at image-drawing terminal point | --- | X-address at image-drawing terminal point |
| 2 | X-address at image-drawing starting point | X-address at image-drawing terminal point | --- | X-address at image-drawing terminal point |
| --- | --- | --- | --- | --- |
| 400 | X-address at image-drawing starting point | X-address at image-drawing terminal point | --- | X-address at image-drawing terminal point |

POLYGONAL IMAGE-DRAWING PROCESSOR

This is a continuation of application Ser. No. 07/932,357 filed Aug. 19, 1992, which in turn is a continuation-in-part of application Ser. No. 07/727,832 filed Jul. 9, 1991, both abandoned.

BACKGROUND OF THE INVENTION

1. Field of the Invention

The present invention relates to a polygonal image-drawing processor in three-dimensional computer graphics such as a work station, game machines, etc.

2. Description of the Related Art

Recently, various kinds of methods for providing a function of graphics have been proposed. In these methods, a three-dimensional display of a full color and a high speed numerical operation ability are required as the graphics function. For example, a graphics system IRIS 4D-MP manufactured by Silicon Graphics Computer Systems is described as a graphics work station in "Videoized machine", pp. 51 to 55 written by Mitsuo Ishii (published by Ohm Co.).

In an optical image-drawing processor used in the above-mentioned graphics system, all the data of picture elements are written to a bit map memory so that a large amount of memory capacity is required. For example, in the case of a CRT display, etc., it is necessary to read data of one picture out of the memory in 1/60 second so that a memory operated at a high speed is required and the processor is complicated and cost thereof is increased.

In a general clipping device, much time is required in clipping processing, or large hardware is required as mentioned above.

Further, in the general clipping device, the range of a receiving coordinate is set to be wider than the size of a screen region. Accordingly, it is necessary to dispose a memory having a large capacity and much memory access time is required.

SUMMARY OF THE INVENTION

It is therefore an object of the present invention to provide a polygonal image-drawing processor in which the size of a circuit structure is reduced and no memory operated at a high speed is required.

In accordance with a first embodiment of the present invention, the above object of the present invention can be achieved by a polygonal image-drawing processor comprising means for providing a direction of a linear vector on each of sides constituting a polygon based on information about two end points X and Y and side information of the polygon; means for dividing each of the polygonal sides into two groups of right-handed and left-handed sides in accordance with the provided direction of the linear vector; means for calculating an X address of each of dots between the two end points by a digital differential analysis with respect to a direction of a Y-coordinate; means for controlling the operation of an image memory in a writing region thereof corresponding to each of the divided groups to write X and Y addresses at left-handed and right-handed intersection points of the polygon to the image memory; and image-drawing processing means for performing a coloring operation between the respective right-handed and left-handed sides based on the X and Y addresses written to the image memory so as to draw an image.

In accordance with a second embodiment of the present invention, the above object of the present invention can be achieved by a polygonal image-drawing processor comprising means for providing a direction of a linear vector on each of sides constituting a polygon based on information about two end points X and Y and side information of the polygon; means for dividing each of the polygonal sides into two groups of right-handed and left-handed sides in accordance with the provided direction of the linear vector; means for adding color information to the two end point information and calculating an X address of each of dots between the end points with respect to a Y address, and further calculating the color information of each of the dots by a digital differential analysis based on the end point information; means for controlling the operation of an image memory in a writing region thereof corresponding to each of the divided groups such that the writing region of the image memory is controlled at left-handed and right-handed intersection points of the polygon to write the X and Y addresses and the color information to the image memory; and image-drawing processing means for performing a coloring operation between the respective right-handed and left-handed sides based on the X and Y addresses and the color information written to the image memory so as to draw an image.

In accordance with a third embodiment of the present invention, the above object of the present invention can be achieved by a polygonal image-drawing processor comprising means for providing a direction of a linear vector on each of sides constituting a polygon based on information about two end points X and Y and side information of the polygon; means for dividing each of the polygonal sides into two groups of right-handed and left-handed sides in accordance with the provided direction of the linear vector; means for calculating addresses at an X-starting point and an X-terminal point of each of dots between the end points every Y-address using a digital differential analysis; and control means for comparing the calculated addresses at the X-starting point and the X-terminal point with addresses at an X-starting point, a Y-starting point, an X-terminal point and a Y-terminal point in a clipping region. The control means changes an X-address or changes the X-address every Y-address. Otherwise, the control means writes the X-starting and X-terminal point addresses every Y-address to an image memory.

In the first and second embodiments of the present invention, the respective polygonal sides are divided into left-handed and right-handed sides of the polygon in accordance with the direction of a linear vector. Points of the polygon on the respective sides thereof are calculated by a digital differential analysis (which is called DDA in the following description) every Y address. Values of X addresses on the right-handed and left-handed sides of the polygon are stored to the image memory.

Accordingly, it is sufficient to calculate only the above points on the respective polygonal sides so that a capacity of the image memory can be reduced and a circuit structure can be made compact. Further, no memory operated at a high speed is required and an image-drawing operation can be performed in 1/60 second with respect to one picture by using a dynamic random access memory (which is called DRAM in the following description).

In the second embodiment of the present invention, a smooth shading operation can be easily performed since the color information of red, green and blue are provided by the digital differential analysis between starting and terminal points on the polygonal sides in parallel with the digital differential analysis of X- and Y-coordinates at a polygonal edge.

In accordance with the third embodiment of the present invention, all X-addresses are set to X-starting point addresses on the screen at a calculating time of X and Y addresses on a polygonal side when X-address values are smaller than X-starting point values on the screen. In contrast to this, when the X-address values are greater than X-terminal point values on the screen, all the X-addresses are set to X-terminal point addresses on the screen. When a Y-address value is smaller than a Y-starting point or greater than a Y-terminal point value on the screen, a writing operation about this Y-address at the X-address starting and terminal points is stopped. Thus, it is possible to reduce a hardware amount and process an image at a high speed.

Further objects and advantages of the present invention will be apparent from the following description of the preferred embodiments of the present invention as illustrated in the accompanying drawings.

BRIEF DESCRIPTION OF THE DRAWINGS

FIG. 5 is a typical view showing a format example of an image memory in the clipping processing;

DESCRIPTION OF THE PREFERRED EMBODIMENTS

The preferred embodiments of a polygonal image-drawing processor in the present invention will next be described in detail with reference to the accompanying drawings.

Figure 1:
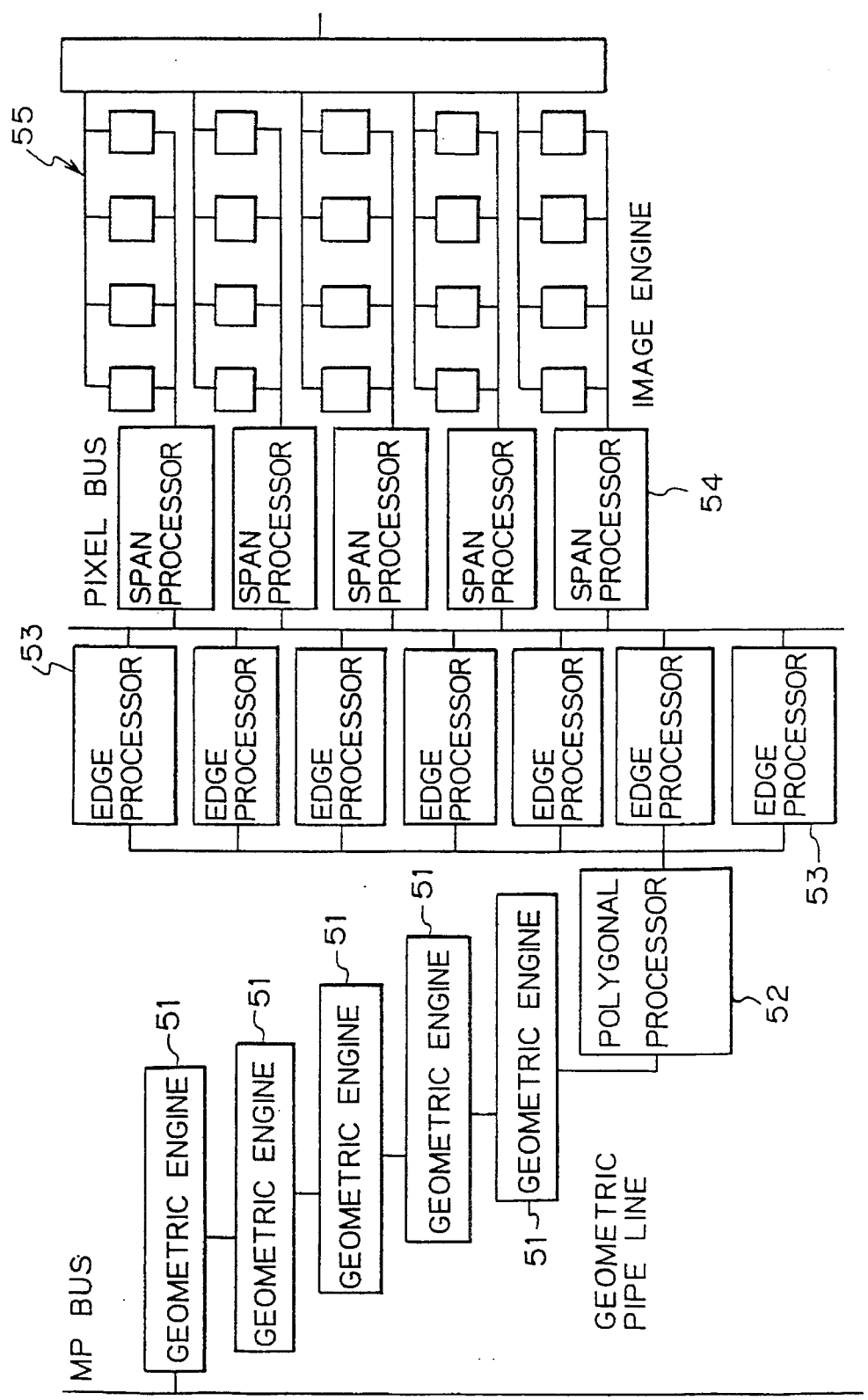
FIG. 1 is a block diagram showing the construction of a general polygonal image-drawing processor.

FIG. 1 shows the construction of a general graphics system. FIG. 2 shows a processing method of this graphics system.

Figure 2A:
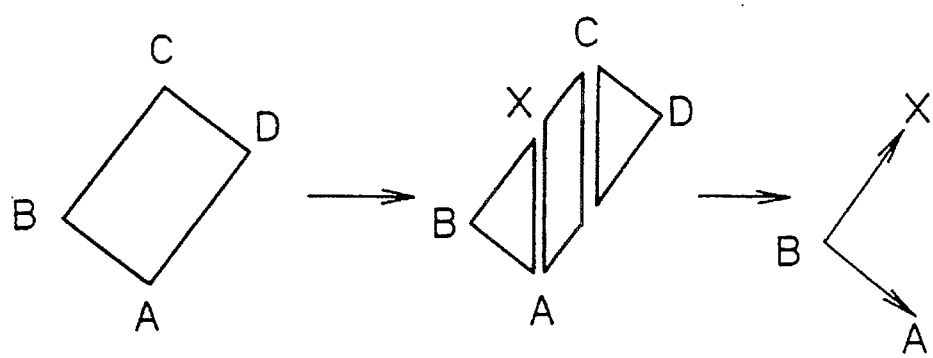
FIGS. 2a to 2c are typical diagrams showing an operation of the general polygonal image-drawing processor shown in FIG. 1.
Figure 2B:
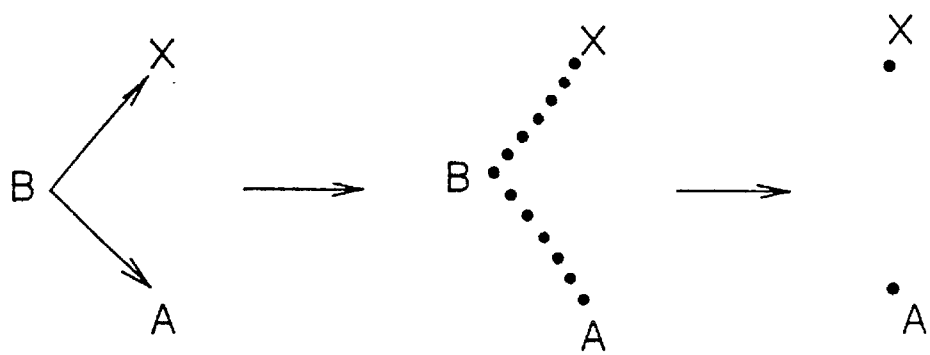
Figure 2C:
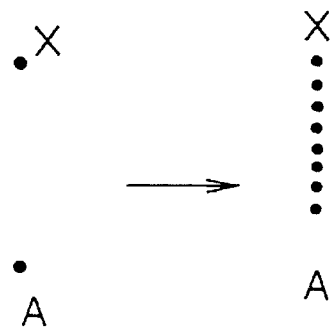

In FIG. 1, a coordinate transformation, clipping, and a perspective transformation are performed by using five geometrical engines 51 by pipe line processing. The geometrical engines 51 are constructed by floating point arithmetic units operated at a high speed and respectively having a performance of 20 MFLOPS. A geometrical pipe line in the pipe line processing is used for only coordinate transformation processing and has a performance of 100 MFLOPS as a total and has an executing performance of 40 MFLOPS. An output on the geometrical pipe line is transmitted to a polygonal processor 52. As shown in FIG. 2a, the polygonal processor 52 receives polygonal data having an arbitrary shape and decomposes these polygonal data into trapezoidal data which can be processed by edge processors 53. As shown in FIG. 2b, the edge processors 53 decompose the trapezoidal data from the polygonal processor 52 to individual spans and transmit the individual spans to five span processors 54. The edge processors 53 are constructed by seven edge processors parallel to each other. The respective edge processors 53 simultaneously calculate initial values at edges x, y, z, r, g, b, a, and rates of changes at these edges. The five span processors 54 are driven by outputs of the edge processors 53. As shown in FIG. 2c, the span processors 54 calculate numerical values of picture elements from the initial values at the individual edges and the rates of changes at these edges. The five span processors 54 are respectively in charge of lines every five columns. Spans are provided from the edge processors 53 to the respective span processors 54 every five spans. The individual span processors 54 are respectively connected to four image engines 55 and data of picture elements of the individual span processors 54 are transmitted to the four image engines 55. Twenty (5×4=20) image engines 55 in total are in charge of picture elements separated every four longitudinal picture elements and every five transversal picture elements. It is possible to provide a coloring speed of 80,000,000 picture elements/second by concurrent processing of the twenty image engines 55.

In an image processor of three-dimensional graphics, polyhedral data are represented by a perspective projecting transformation as a collection of point information obtained by deforming each of vertex coordinates of a polyhedron to two-dimensional coordinates X and Y. When such a perspective projecting transformation is performed, a distance between a starting point and each of the vertex coordinates of the polyhedron is calculated in advance. The two-dimensional point information calculated by the perspective projecting transformation is classified every polygon representing the polyhedron. Clipping processing is performed with respect to a figure in which the classified polygon is located outside the screen.

Figure 3A:
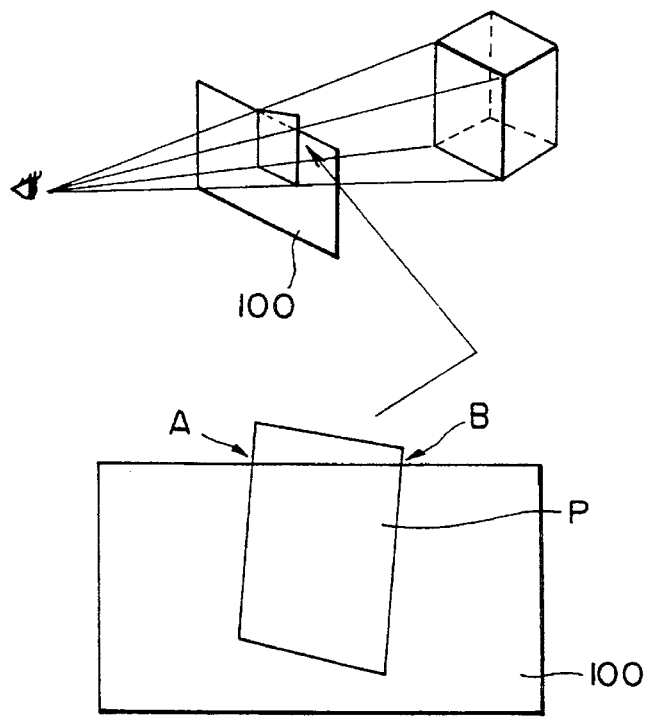
FIGS. 3a and 3b are typical views showing clipping processing.
Figure 3B:
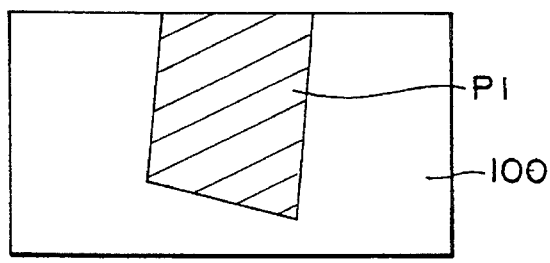

As shown in FIGS. 3a and 3b, in the clipping processing in this three-dimensional graphics, each of intersection points A and B on external sides located outside a screen plane 100 is calculated at a time of the projecting transformation of a polygon P. Thus, deforming processing is performed with respect to a new polygon P1 included on the screen plane 100 is deformed. This new polygon is transferred to a polygonal processor. As shown in FIG. 5, the polygonal processor calculates values of an X starting point and an X terminal point about a Y address.

Figure 4:
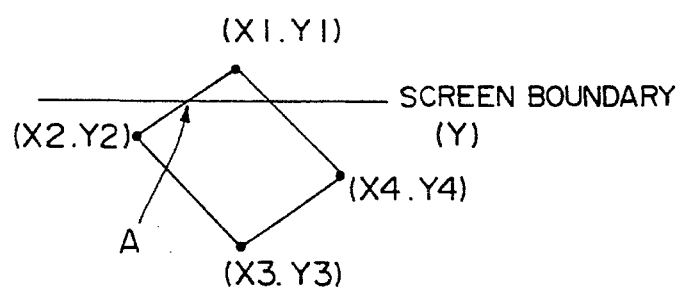
FIG. 4 is a typical view showing clipping processing.

In this clipping processing in the general three-dimensional graphics, as shown in FIG. 4, end points of a polygon are set to (X1,Y1), (X2,Y2), (X3,Y3) and (X4,Y4). In this case, when intersection points between the screen plane and the polygon are calculated, it is necessary to calculate an intersection point A by the following complicated formula at Y-coordinate on a boundary of the screen.

$$A = X2 + \frac{X2 - X1}{Y2 - Y1} \times (Y - Y1)$$

In the optical image-drawing processor used in the above-mentioned graphics system, all picture element data are written to a bit map memory so that a large amount of memory capacity is required. For example, in the case of a CRT display, etc., it is necessary to read data of one picture out of the memory in 1/60 second so that a memory operated at a high speed is required and the processor is complicated and cost thereof is increased.

In the general clipping device, much time is required in clipping processing, or large hardware is required as mentioned above.

Further, in the general clipping device, the range of a receiving coordinate is set to be wider than the size of a screen region. Accordingly, it is necessary to dispose a memory having a large capacity and much memory access time is required.

A polygonal image-drawing processor in accordance with a first embodiment of the present invention will next be described with reference to FIGS. 6 to 11 and FIGS. 16 to 21.

Figure 6:
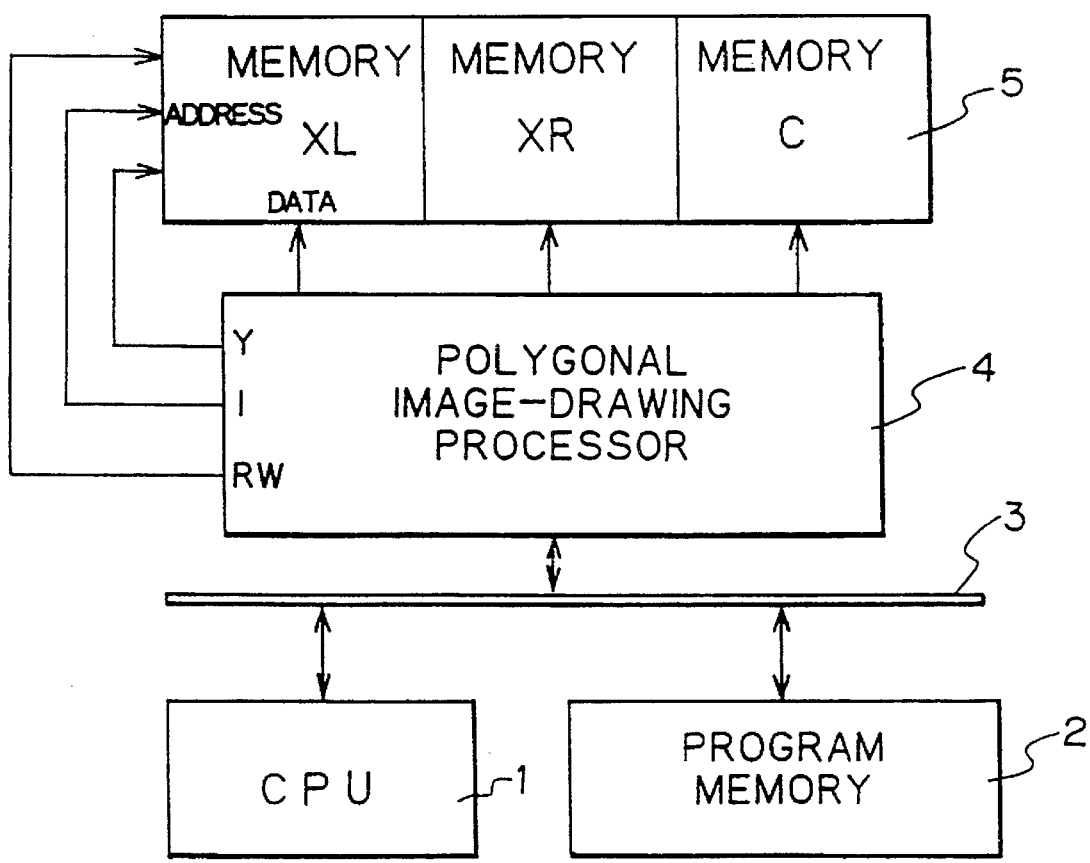
FIG. 6 is a block diagram of a system using a polygonal image-drawing processor in accordance with a first embodiment of the present invention.
Figure 7:
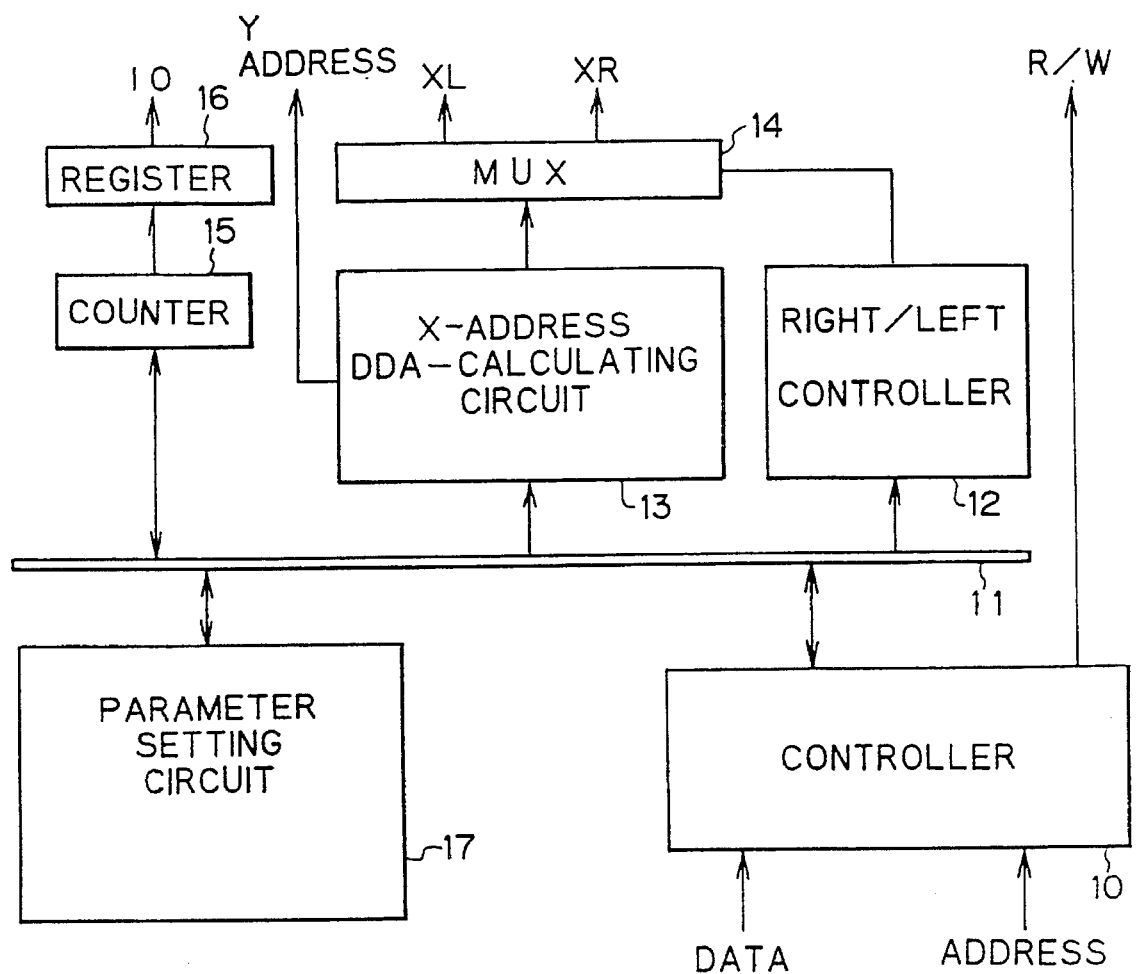
FIG. 7 is a block diagram showing a main portion of the polygonal image-drawing processor in the first embodiment of the present invention.

FIG. 6 is a block diagram of a system using the polygonal image-drawing processor in the first embodiment of the present invention. FIG. 7 is a block diagram showing a main portion of the polygonal image-drawing processor in the first embodiment of the present invention.

In FIG. 6, a control processor unit (which is called CPU in the following description) 1 transmits side information of a polygon, X and Y addresses at starting points on respective sides of the polygon, X and Y addresses at terminal points on the respective polygonal sides, etc. to a polygonal image-drawing processor 4 through a bus 3 by a program written to a program memory 2.

An image memory 5 is constructed by a dynamic random access memory (DRAM), etc. Data of picture elements such as a calculated left-handed intersection point (XL) of the polygon, a calculated right-handed intersection point (XR) of the polygon, color information (C) of the polygon, etc. are written to the image memory 5 by the polygonal image-drawing processor 4 in the present invention. This image memory 5 is formed in formats shown in the following Tables 1 and 2.

TABLE 1

| horizontal scanning line Y address | polygon 1 left-handed intersection point | right-handed intersection point | ... | polygon n right-handed intersection point |
|---|---|---|---|---|
| 1 | X address at image-drawing starting point | X address at image-drawing terminal point | ... | X address at image-drawing terminal point |
| 2 | X address at image-drawing starting point | X address at image-drawing terminal point | ... | X address at image-drawing terminal point |
| 3 | X address at image-drawing starting point | X address at image-drawing terminal point | ... | X address at image-drawing terminal point |
| . | . | . | | . |
| . | . | . | | . |
| . | . | . | | . |
| 400 | X address at image-drawing starting point | X address at image-drawing terminal point | ... | X address at image-drawing terminal point |

TABLE 2

| polygon 1 | color information 1 |
|---|---|
| . | . |
| . | . |
| polygon n | color information n |

In the above Tables 1 and 2, Y addresses correspond to horizontal scanning lines. In these formats, values of X addresses at the left-handed intersection point (XL) and the right-handed intersection point (XR) of each of polygons 1 to n are written to the image memory 5 with respect to Y addresses 1 to 400 respectively corresponding to horizontal scanning lines 1 to 400. The X address at the left-handed intersection point (XL) shows an X address at an image-drawing starting point on a scanning line. The X address at the right-handed intersection point (XR) shows an X address at an image-drawing terminal point on the scanning line.

Data of color information of each of the polygons 1 to n are also written to the image memory 5 in the first embodiment of the present invention.

As mentioned above, the image memory 5 is formed in the above formats such that only the color information and the intersection point information on the respective sides of the polygons 1 to n are written to the image memory 5. Accordingly, an amount of information written to the image memory 5 is small so that a capacity of the image memory 5 can be reduced. Further, it is possible to reduce data information read out of the image memory 5 so that it is not necessary to dispose a memory having a high reading speed.

The polygonal image-drawing processor in the first embodiment of the present invention will next be described with reference to FIG. 7.

Figure 9A:
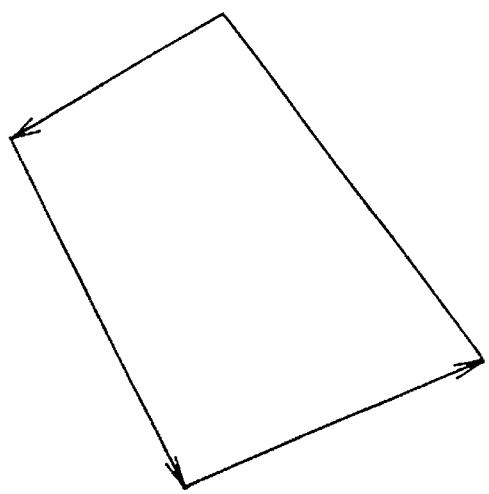
FIGS. 9a and 9b are typical diagrams showing side vectors of a polygon.
Figure 9B:
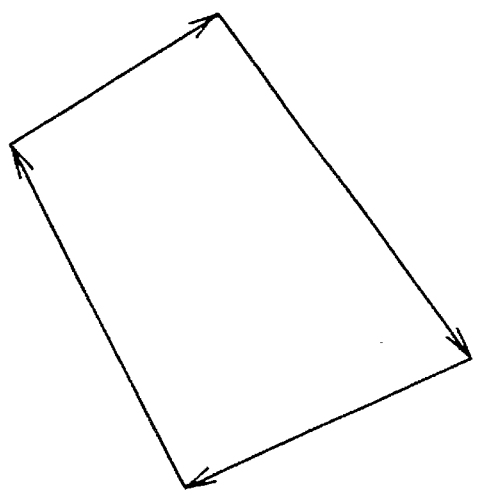

A controller 10 controls operations of respective constructional portions in accordance with flow charts shown in FIGS. 16 to 21. Polygonal data and address information are transmitted to this controller 10 from the control processor unit 1 shown in FIG. 6. The information provided from the central processor unit 1 to the controller 10 are composed of information at two end points of X and Y, and side information showing a right-handed or left-handed rotation of the polygon as shown in FIGS. 9a and 9b. A linear directional vector (DIR) on each of sides constituting the polygon is calculated by the controller 10 on the basis of the end point information and the side information of the polygon.

FIGS. 9a and 9b respectively show the right-handed and left-handed rotations of the polygon.

Figure 8:
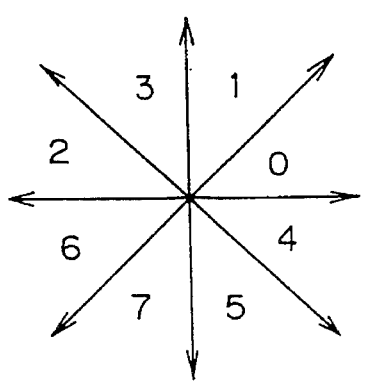
FIG. 8 is a typical diagram showing regions of linear directional vectors.

Information of the calculated linear directional vector (DIR) shown in FIG. 8 on each side of the polygon is transmitted from the controller 10 to a left/right controller 12 through a bus 11.

The left/right controller 12 judges whether the provided linear directional vector (DIR) is located on a right-handed or left-handed side of the polygon in accordance with the following Table 3.

TABLE 3

| | directional vector | | | | | | | |
|---|---|---|---|---|---|---|---|---|
| | 0 | 1 | 2 | 3 | 4 | 5 | 6 | 7 |
| sides | right-handed side | right-handed side | right-handed side | right-handed side | left-handed side | left-handed side | left-handed side | left-handed side |

Thus, the linear directional vectors on the respective polygonal sides are divided into two groups of the right-handed and left-handed sides.

An operation of the image memory 5 is controlled in writing regions thereof at the left-handed intersection point (XL) and the right-handed intersection point (XR) on the basis of the divided right-handed or left-handed sides.

An X address DDA-calculating circuit 13 calculates an X address on each of the polygonal sides by a digital differential analysis (DDA). The X address DDA-calculating circuit 13 makes the digital differential analysis from values of X and Y coordinates at starting and terminal points on the polygonal sides with respect to each of dots between end points thereof. Values of the Y and X addresses are outputted from the X address DDA-calculating circuit 13 to a multiplexer 14.

An operation of the multiplexer 14 is controlled by the left/right controller 12. The value of the X address from the X address DDA-calculating circuit 13 is written by this multiplexer 14 to one of the writing regions of the image memory 5 for the intersection points (XR) and (XL).

A counter 15 counts the number of polygons with respect to the Y address. A register 6 latches an output of the counter 15. Information with respect to an intersection point I0 of the polygon is transmitted from the register 6 to the image memory 5 by the output of the counter 15.

A parameter setting circuit 17 calculates parameters required in each block of the digital differential analysis based on addresses at a starting point (XC1, YC1) and a terminal point (XC2, YC2) constituting end points on each of the polygonal sides.

Figure 10:
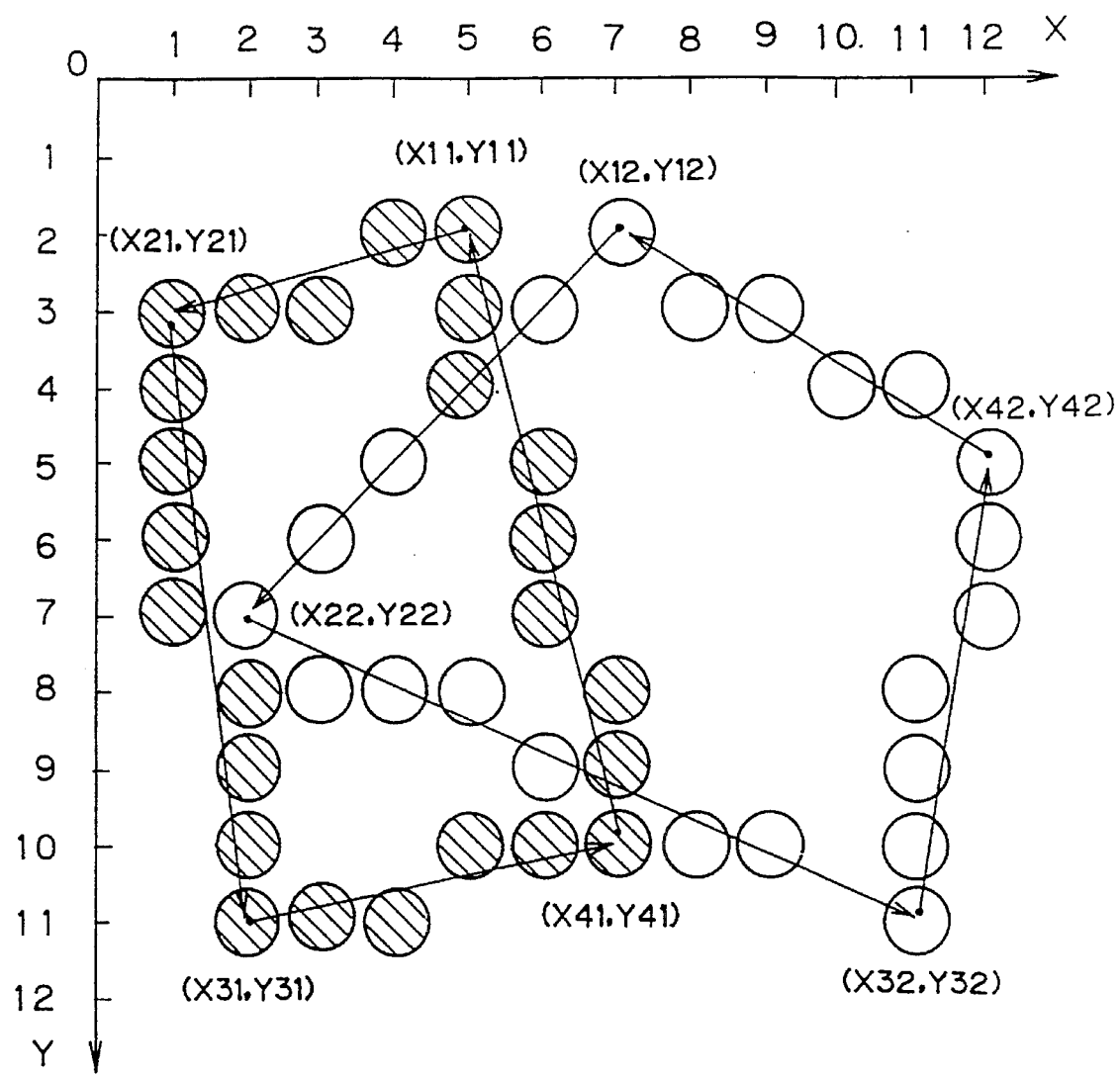
FIG. 10 is a typical view showing an image-drawing state of the polygon in accordance with the present invention.

FIG. 10 shows two polygons. Each of dots constituting a first polygon is shown by hatching. End point information on respective sides of this first polygon are provided as follows.

(X11, Y11)=(5, 2), (X21, Y21)=(1, 3)

(X31, Y31)=(2, 11), (X41, Y41)=(7, 10)

In FIG. 10, a second polygon is constructed by dots shown by white circles. End point information on respective sides of this second polygon are provided as follows.

(X12, Y12)=(7, 2), (X22, Y22)=(2, 7)

(X32, Y32)=(11, 11), (X42, Y42)=(12, 5)

The respective sides of each of the polygons are divided into left-handed or right-handed sides thereof by the right-handed or left-handed rotation of each polygon based on the above end point information on the respective polygonal sides and a vector direction of each polygon as shown in FIG. 9.

In the case of the first polygon, the left-handed sides of the first polygon are constructed by two linear vectors composed of a linear vector provided by (X11, Y11) and (X21, Y21) and a linear vector provided by (X21, Y21) and (X31, Y31). The right-handed sides of the first polygon are constructed by two linear vectors composed of a linear vector provided by (X31, Y31) and (X41, Y41) and a linear vector provided by (X41, Y41) and (X11, Y11).

In the case of the second polygon, the left-handed sides of the second polygon are constructed by two linear vectors composed of a linear vector provided by (X12, Y12) and (X22, Y22) and a linear vector provided by (X22, Y22) and (X32, Y32). The right-handed sides of the second polygon are constructed by two linear vectors composed of a linear vector provided by (X32, Y32) and (X42, Y42) and a linear vector provided by (X42, Y42) and (X12, Y12).

Both the above first and second polygons show the right-handed rotation.

The X address DDA-calculating circuit 13 makes the digital differential analysis based on the end point information on the respective polygonal sides and Bresenham algorithm, and calculates values of X addresses with respect to each of the Y addresses. Respective calculated dots on the right-handed and left-handed sides are respectively written to the writing regions of the image memory 5 for the right-handed intersection point XR and the left-handed intersection point XL by controlling these calculated dots by the multiplexer 14. The written results of the image memory 5 are shown in the following Table 4.

TABLE 4

| Y address | XL1 | XR1 | XL2 | XR2 |
|---|---|---|---|---|
| 0 | | | | |
| 1 | | | | |
| 2 | 4 | 5 | 7 | 7 |
| 3 | 1 | 5 | 6 | 9 |
| 4 | 1 | 5 | 5 | 11 |
| 5 | 1 | 6 | 4 | 12 |
| 6 | 1 | 6 | 3 | 12 |
| 7 | 1 | 6 | 2 | 12 |
| 8 | 2 | 7 | 3 | 11 |
| 9 | 2 | 7 | 6 | 11 |
| 10 | 2 | 7 | 8 | 11 |
| 11 | 2 | 4 | 10 | 11 |
| 12 | | | | |

In the present invention, as mentioned above, the left-handed intersection point (XL) is used as an X address at an image-drawing starting point on a scanning line and the right-handed intersection point (XR) is used as an X address at an image-drawing terminal point on the scanning line. Accordingly, as shown in FIG. 10, when there are a plurality of X addresses with respect to the same Y address, the operation of the polygonal image-drawing processor is controlled such that only the X address of an outermost picture element of the polygon is written to the image memory 5. Namely, as shown in FIGS. 9a and 9b, in the case of a linear directional vector, the outermost picture element can be determined by the linear directional vector and the right-handed or left-handed rotation thereof. Only the X address of a dot of this outermost picture element is written to the image memory 5. For example, in FIG. 10, there are three picture elements of X addresses 1, 2 and 3 with respect to Y address 3. In this case, only the outermost X address 1 is written to the image memory 5.

As shown in Table 4, the X addresses at the left-handed intersection point XL and the right-handed intersection point XR are written to the image memory 5 in accordance with the Y addresses of each of the polygons. Data with respect to the left-handed intersection point XL and the right-handed intersection point XR are read out of this image memory 5 by an unillustrated CRT display. The left-handed intersection point XL is used as an X address at the image-drawing starting point on the scanning line based on these data. After this left-handed intersection point XL, a coloring operation is performed until the right-handed intersection point XR of the X address at the image-drawing terminal point based on color information of the polygon written to the image memory 5 in advance.

In the above polygonal image-drawing processor, the information read out of the image memory 5 are composed of only the color information of a polygon and information at the left-handed intersection point XL and the right-handed intersection point XR on the scanning line. Accordingly, it is sufficient to construct the image memory 5 by a dynamic random access memory (DRAM), etc. having a reading speed such as about 200 ns.

The operation of the polygonal image-drawing processor in the first embodiment of the present invention will next be described with reference to flow charts shown in FIGS. 16 to 21.

In steps S1 to S15, parameters for making the digital differential analysis are calculated by the parameter setting circuit 17.

In the step S1, the number of polygons is written to an internal register NM of the parameter setting circuit 17. In this embodiment, the number of polygons is set to "1" and this number is written to this internal register NM. In a register RL, a right-handed or left-handed rotation is set with respect to side vectors of a polygon as shown in FIGS. 9a and 9b. Number "1" shows the right-handed rotation and number "0" shows the left-handed rotation. Further, number "1" is set in a register SS.

In the step S2, coordinates at two end points on one side of the polygon are respectively set.

In the step S3, a distance between two points is calculated with respect to each of X and Y addresses and the calculated distance is set in registers. Namely, a distance DELTAX=XC2−XC1 between starting and terminal points of an X-coordinate is set in a DELTAX register. A distance DELTAY=YC2−YC1 between starting and terminal points of a Y-coordinate is set in a DELTAY register.

In the step S4, flags FL1, FL2 and FL3 for representing a linear directional vector shown in FIG. 9 by three bits are initialized. In this embodiment, the flags FL1, FL2 and FL3 are respectively set to 1, 0 and 0.

In the step S5, it is judged whether the distance DELTAY is smaller than zero or not. When the distance DELTAY is smaller than zero, it proceeds to step S6.

In the step S6, the distance DELTAY is multiplied by "−1" to change this distance to a positive value. Further, the flag FL1 is rewritten and set to zero and it proceeds to step S7.

In the step S7, it is judged whether the distance DELTAX is smaller than zero or not. When the distance DELTAX is smaller than zero, it proceeds to step S8. In contrast to this, when the distance DELTAX is greater than zero, it proceeds to step S9.

In the step S8, the distance DELTAX is multiplied by "−1" to change the value thereof in the DELTAX register to a positive value. Further, the flag FL2 is set to "1" and it proceeds to step S9.

In the step S9, values of the distances DELTAX and DELTAY are compared with each other. When the distance DELTAY is greater than the distance DELTAX, it proceeds to step S10. In contrast to this, when the distance DELTAX is greater than the distance DELTAY, it proceeds to step S11.

In the step S10, the value of the distance DELTAX is exchanged for that of the distance DELTAY. Further, the flag FL3 is set to "1" and it proceeds to the step S11.

In the step S11, the linear directional vector DIR is provided by calculating DIR=FL1×4+FL2×2+FL3. This calculated value of the linear directional vector DIR is set in a DIR register.

In the step S12, a parameter CONS2 based on the Bresenham algorithm is provided by calculating CONS2=2× DELTAY and this calculated value is set in a CONS2 register.

In the step S13, an error E in the above parameter based on the Bresenham algorithm is provided by calculating E=CONS2−DELTAX and this calculated value is set in an E-register.

In the step S14, a parameter CONS1 based, on the Bresenham algorithm is provided by calculating CONS1= E−DELTAX and this calculated value is set in a CONS1 register.

In the step S15, X and Y addresses at the starting point are set in registers X and Y.

In a step S16, a subroutine POUT3a is called. This subroutine POUT3a is a routine for writing address values at the left-handed intersection point XL and the right-handed intersection point XR to the image memory. Namely, in this subroutine, it is judged whether the polygonal sides are left-handed or right-handed sides, and an operation for writing the address values at the left-handed intersection point XL and the right-handed intersection point XR to the image memory is controlled.

Figure 19:
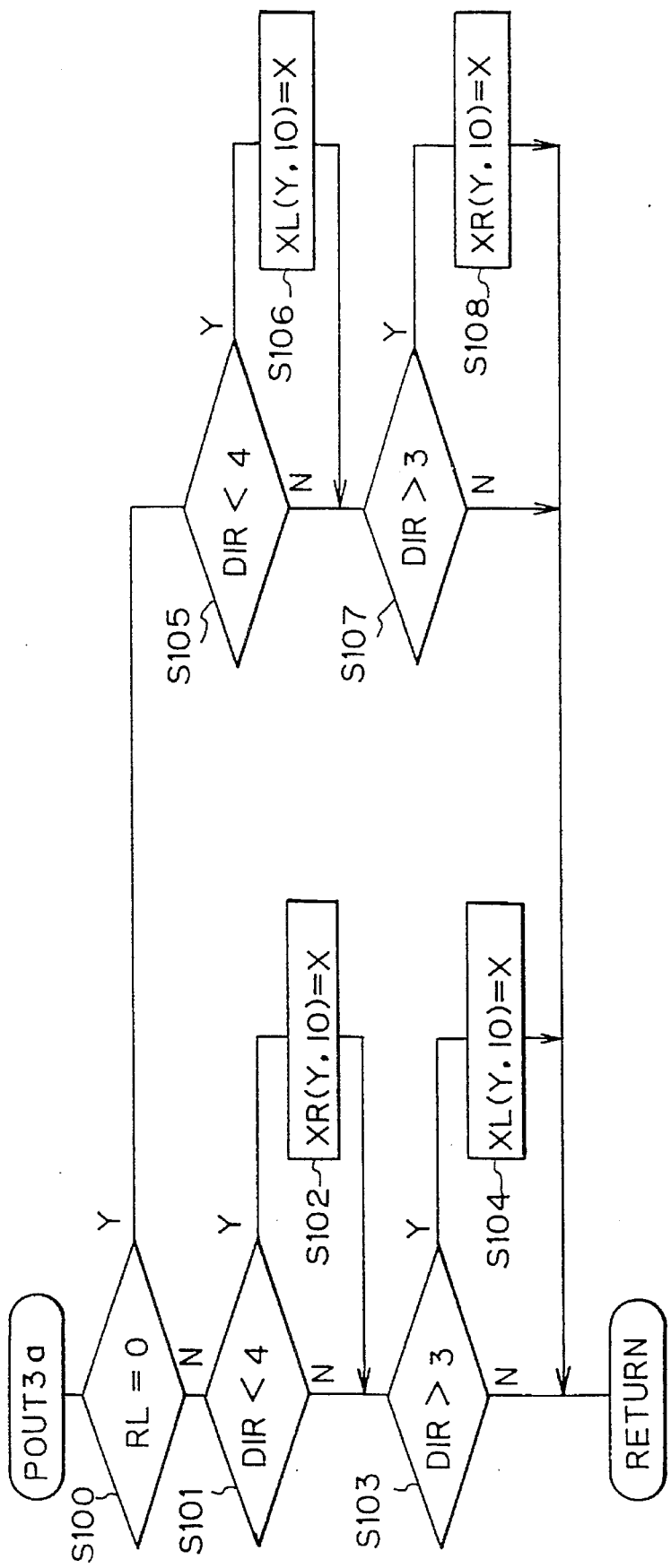
FIG. 19 is a flow chart for explaining the operation of the polygonal image-drawing processor in the first embodiment of the present invention.

FIG. 19 shows the subroutine POUT3a. Procedures of the subroutine POUT3a will next be described with reference to FIG. 19.

In a step S100, it is judged whether an RL register shows value "0" or not. When the RL register shows value "0", the linear vector of a polygon shows the left-handed rotation. Accordingly, it proceeds to a step S105 to perform processing for the left-handed rotation. In contrast to this, when the RL register shows value "1", it proceeds to a step S101 to perform processing for the right-handed rotation.

In the step S101, it is judged whether or not a value of the linear directional vector DIR is smaller than 4. Namely, it is judged whether or not this linear directional vector is located on the right-handed side of the polygon. When the value of the linear directional vector DIR is smaller than 4, the linear direction vector DIR is located on the right-handed side of the polygon so that it proceeds to a step S102. In this step S102, a registered value of an X-register is written to an address of an XR memory in which Y and I0 addresses are respectively located in upper and lower positions. In contrast to this, when the value of the linear directional vector DIR is equal to or greater than 4, it proceeds to a step S103.

In the step S103, it is judged whether the value of the linear directional vector DIR is greater than 3 or not. Namely, it is judged whether or not this linear directional vector DIR is located on the left-handed side of the polygon. When the value of the linear directional vector DIR is greater than 3, this linear directional vector is located on the left-handed side of the polygon so that it proceeds to a step S104. In the step S104, the registered value of the X-register is written to an address of an XL memory in which Y and I0 addresses are respectively located in upper and lower positions.

When the registered value of the RL register shows value "0" in the step S100, the linear directional vector of the polygon shows the left-handed rotation thereof so that it proceeds to the step S105.

In the step S105, it is judged whether the value of the linear directional vector DIR is smaller than 4 or not. Namely, it is judged whether or not this linear directional vector DIR is located on the left-handed side of the polygon. When the value of the linear directional vector DIR is smaller than 4, this linear directional vector is located on the left-handed side of the polygon so that it proceeds to a step S106. The registered value of the X-register is written to an address of the XL memory in which Y and I0 addresses are respectively located in upper and lower positions. In contrast to this, when the value of the linear directional vector DIR is equal to or greater than 4, it proceeds to a step S107.

In the step S107, it is judged whether the value of the linear directional vector DIR is greater than 3 or not. Namely, it is judged whether or not this linear directional vector DIR is located on the right-handed side of the polygon. When the value of the linear directional vector DIR is greater than 3, this linear directional vector DIR is located on the right-handed side of the polygon so that it proceeds to a step S108. In the step S108, the registered value of the X-register is written to an address of the XR memory in which Y and I0 addresses are respectively located in upper and lower positions.

When the subroutine POUT3a is completely executed, it proceeds to a step S17.

Procedures after the step S17 are set to make the digital differential analysis based on the X address DDA-calculating circuit 13.

In the step S17, an incremental operation of a counter C1 is performed and it proceeds to a step S18.

Figure 20:
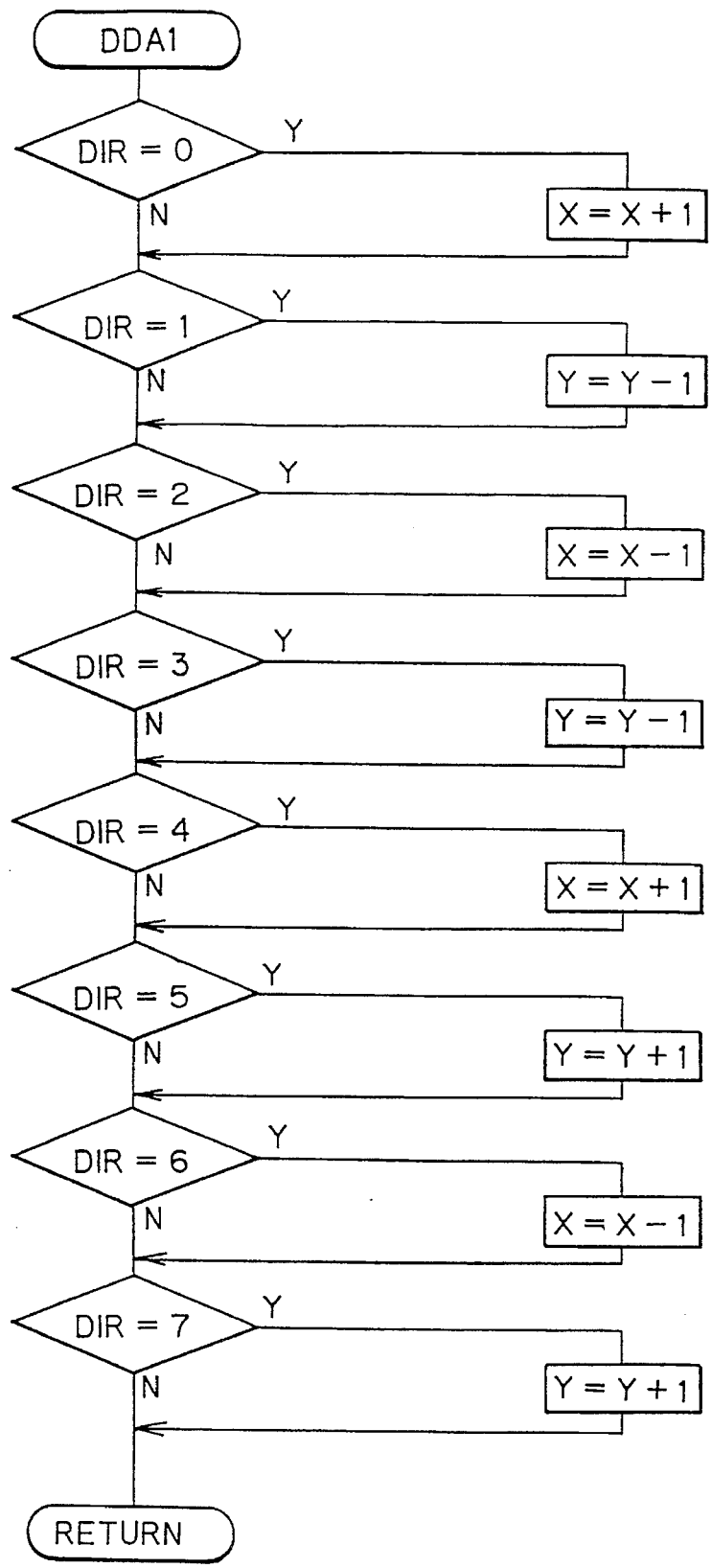
FIG. 20 is a flow chart for explaining the operation of the polygonal image-drawing processor in the first embodiment of the present invention.

In the step S18, a subroutine DDA1 is called. As shown in FIG. 20, in the subroutine DDA1, an incremental or decremental operation about a registered value of the X-register or the Y-register is performed by the digital differential analysis (DDA) with respect to the linear directional vector (DIR). When the subroutine DDA1 is completely executed, it proceeds to a step S19.

In the step S19, the registered value of a flag register FLX is cleared and set to value "0" and it proceeds to a step S20.

In the step S20, it is judged whether a registered value of the E-register is "0" or not on the basis of the Bresenham algorithm. When the registered value of the E-register is greater than value "0", it proceeds to a step S21. In contrast to this, when the registered value of the E-register is smaller than value "0", it proceeds to a step S24.

Figure 21:
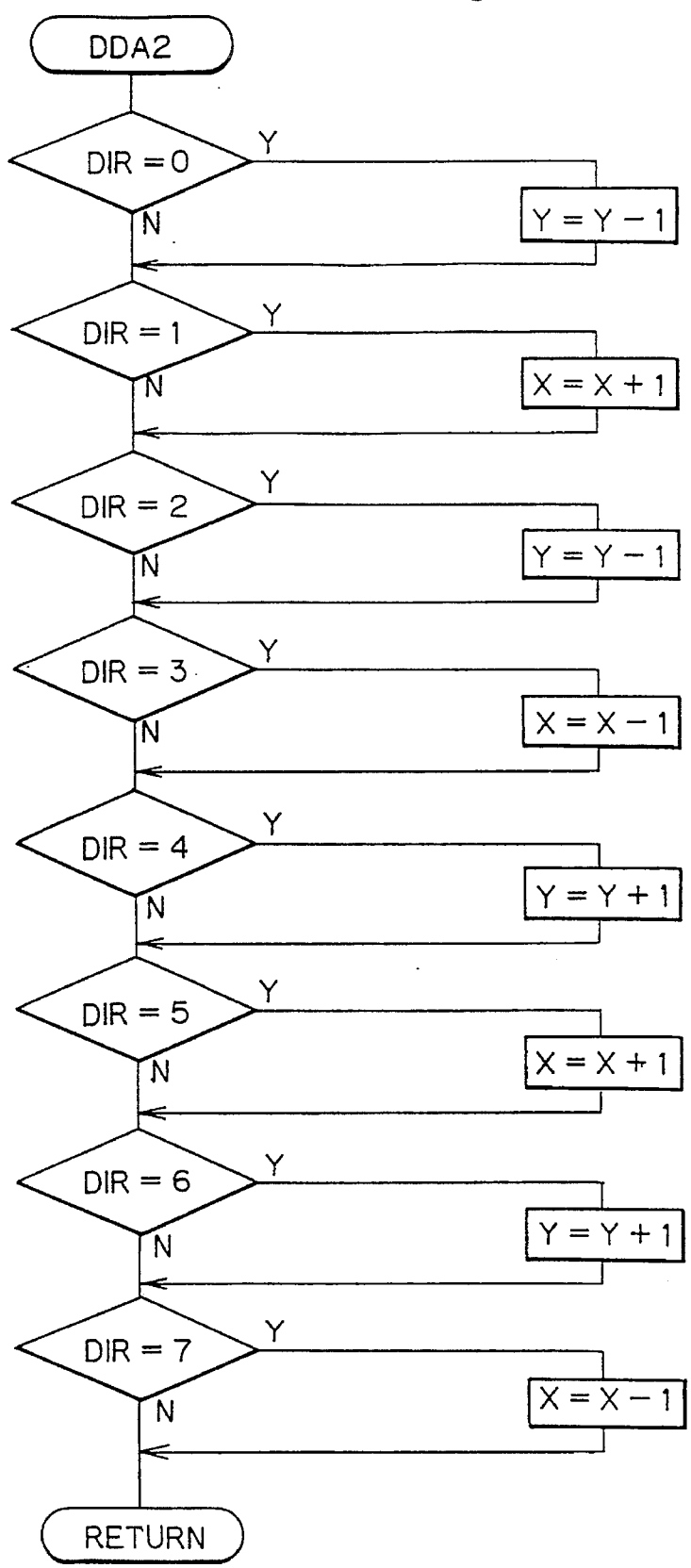
FIG. 21 is a flow chart for explaining the operation of the polygonal image-drawing processor in the first embodiment of the present invention.
Figure 22:
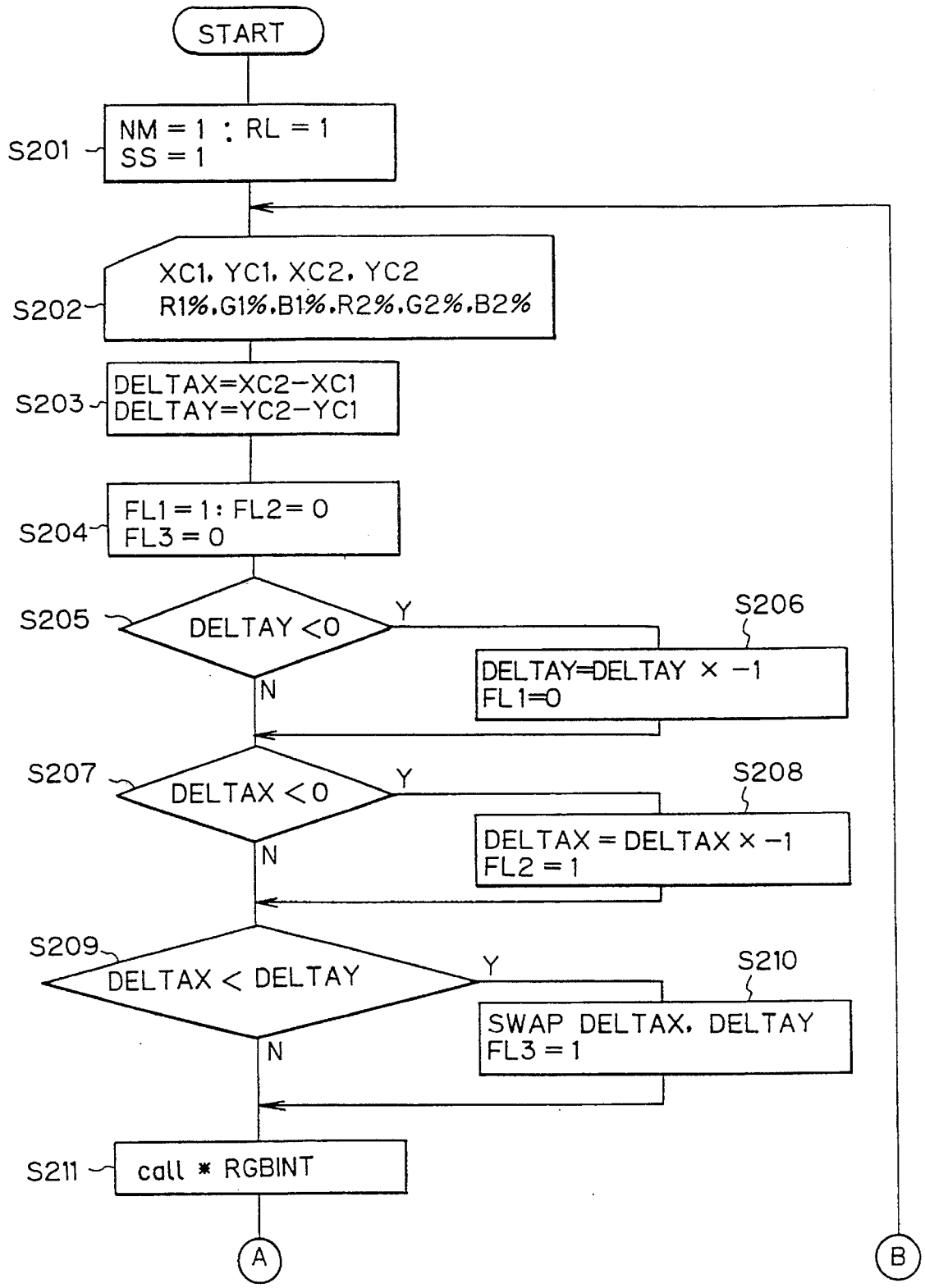
FIG. 22 is a flow chart for explaining an operation of the polygonal image-drawing processor in the second embodiment of the present invention.
Figure 23:
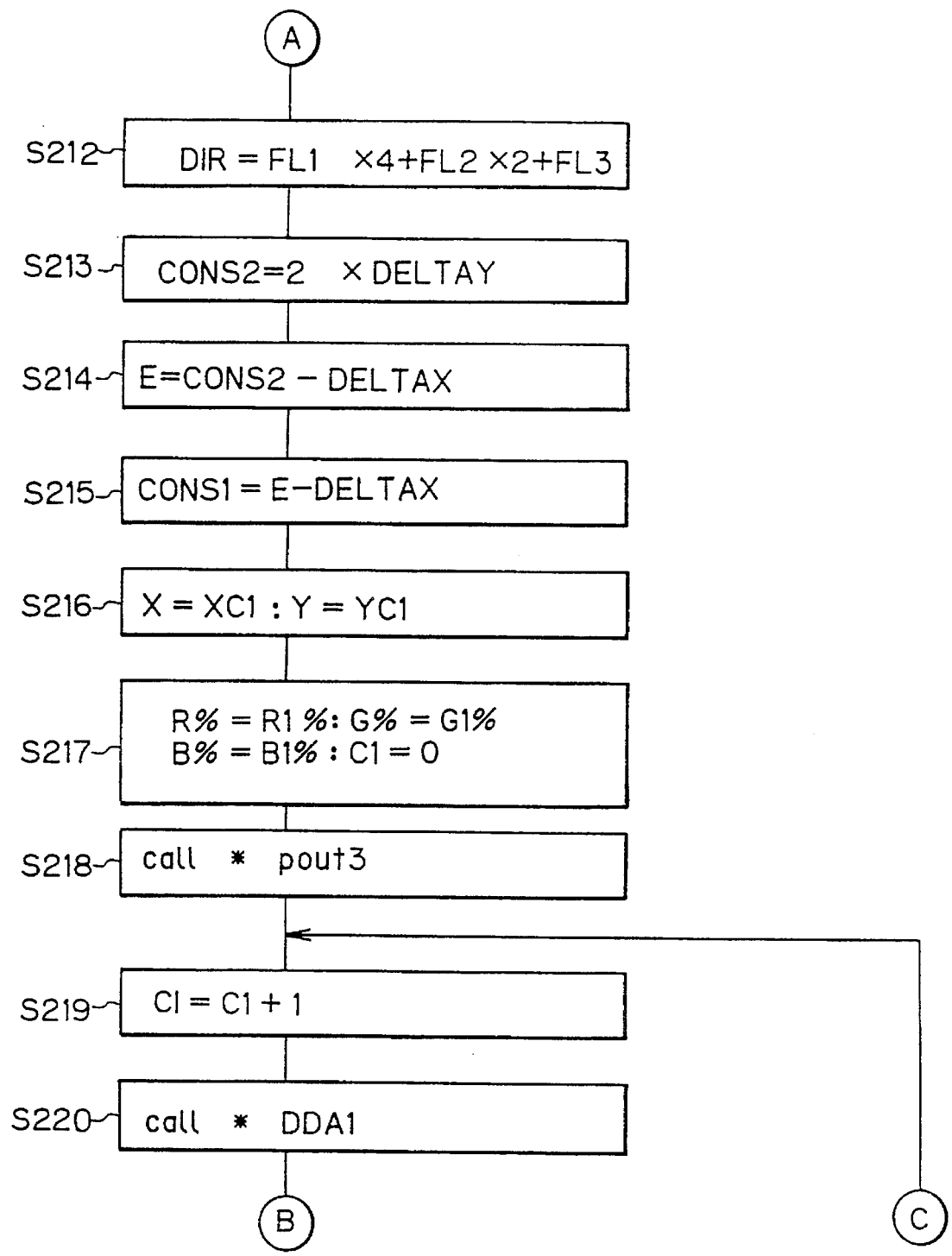
FIG. 23 is a flow chart for explaining the operation of the polygonal image-drawing processor in the second embodiment of the present invention.
Figure 24:
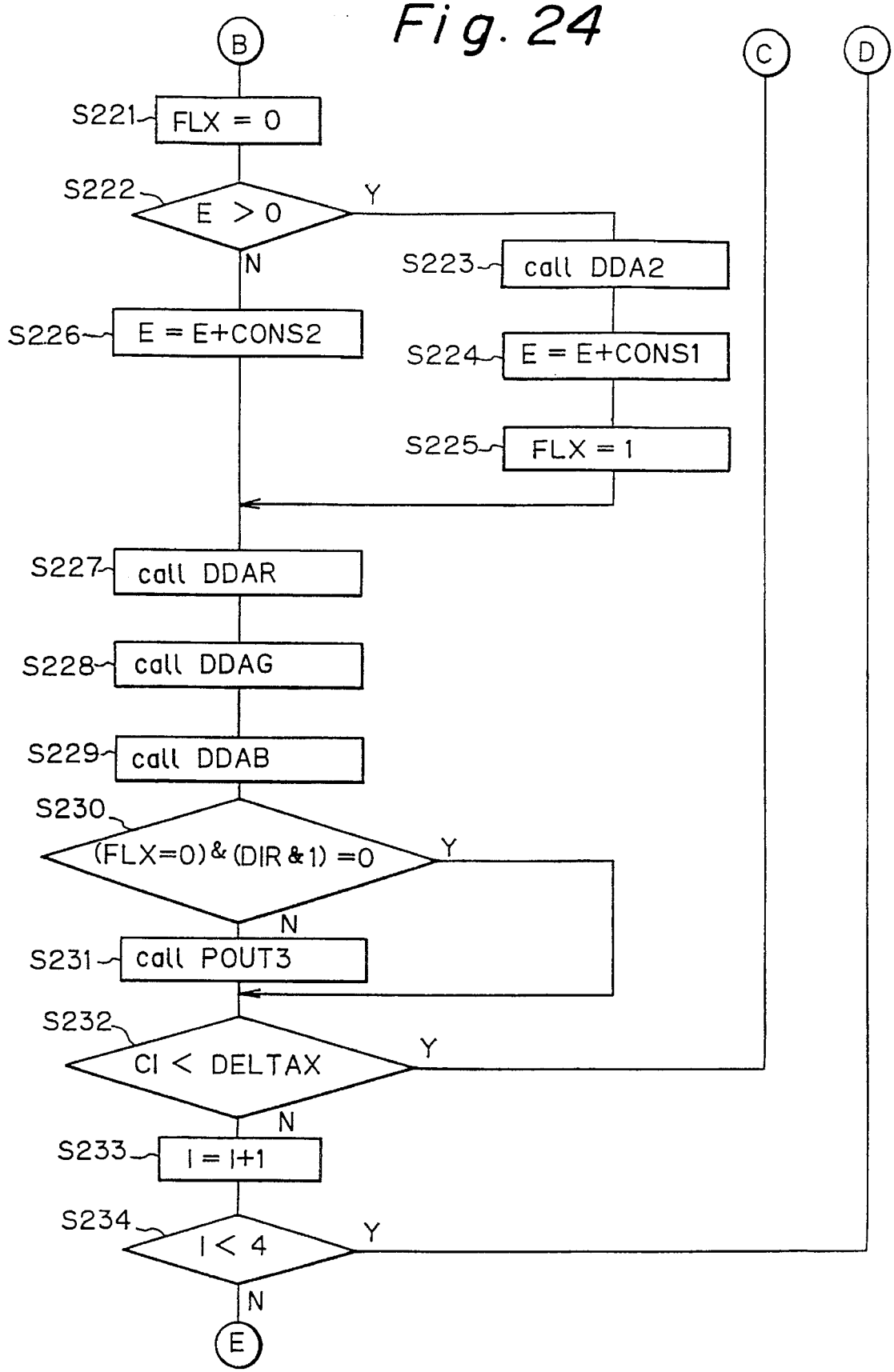
FIG. 24 is a flow chart for explaining the operation of the polygonal image-drawing processor in the second embodiment of the present invention.
Figure 25:
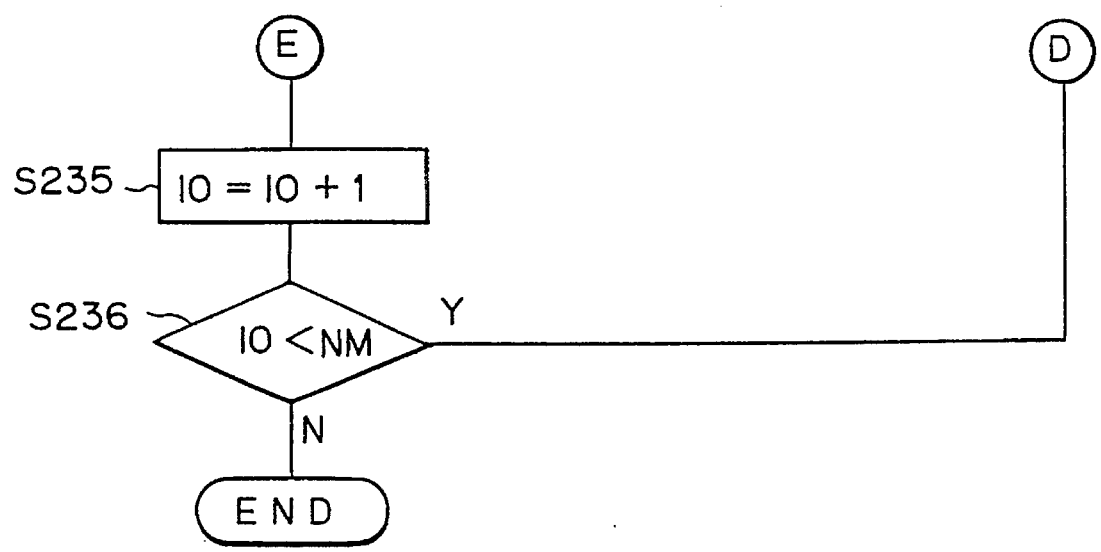
FIG. 25 is a flow chart for explaining the operation of the polygonal image-drawing processor in the second embodiment of the present invention.
Figure 26:
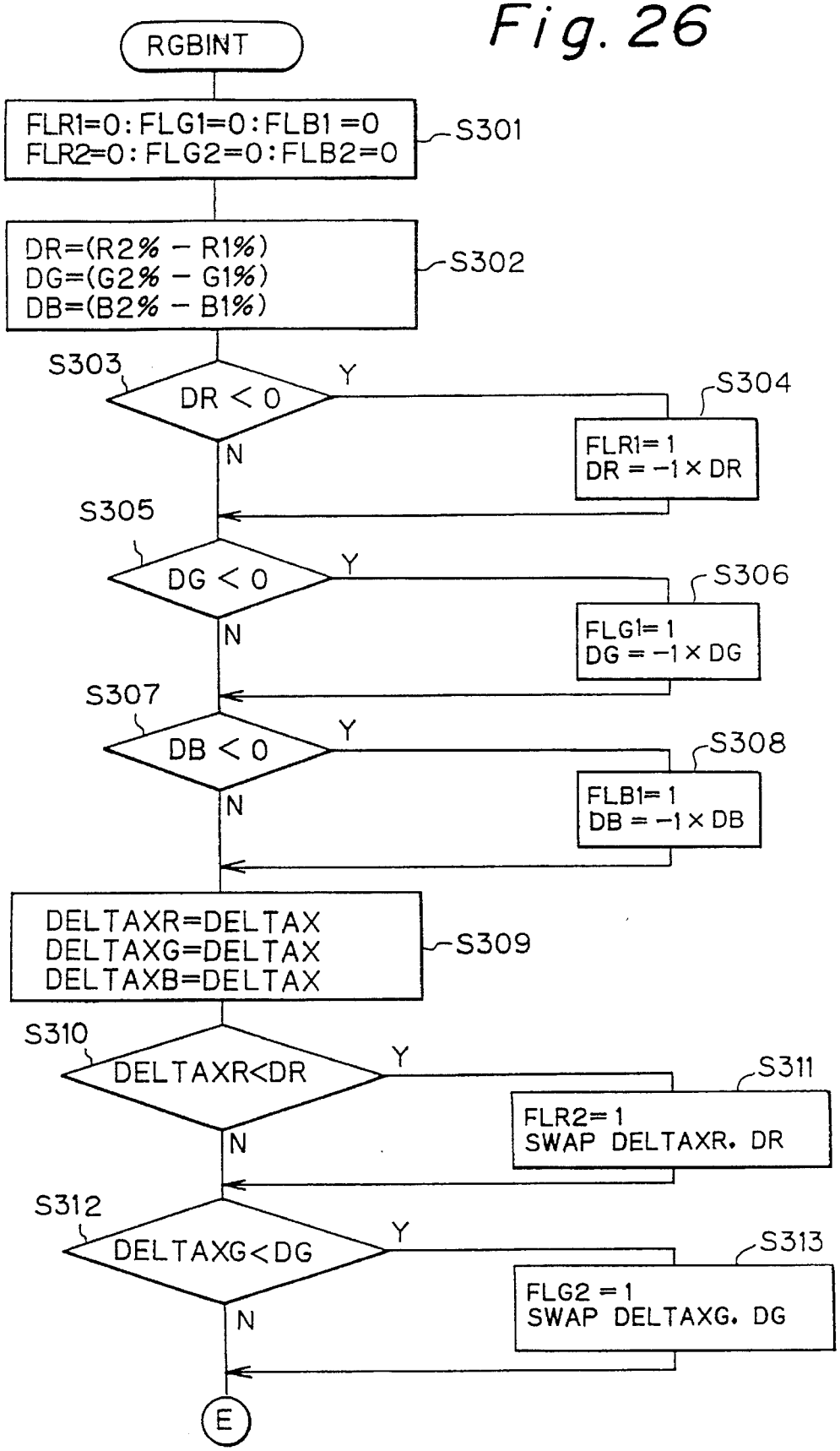
FIG. 26 is a flow chart for explaining the operation of the polygonal image-drawing processor in the second embodiment of the present invention.
Figure 27:
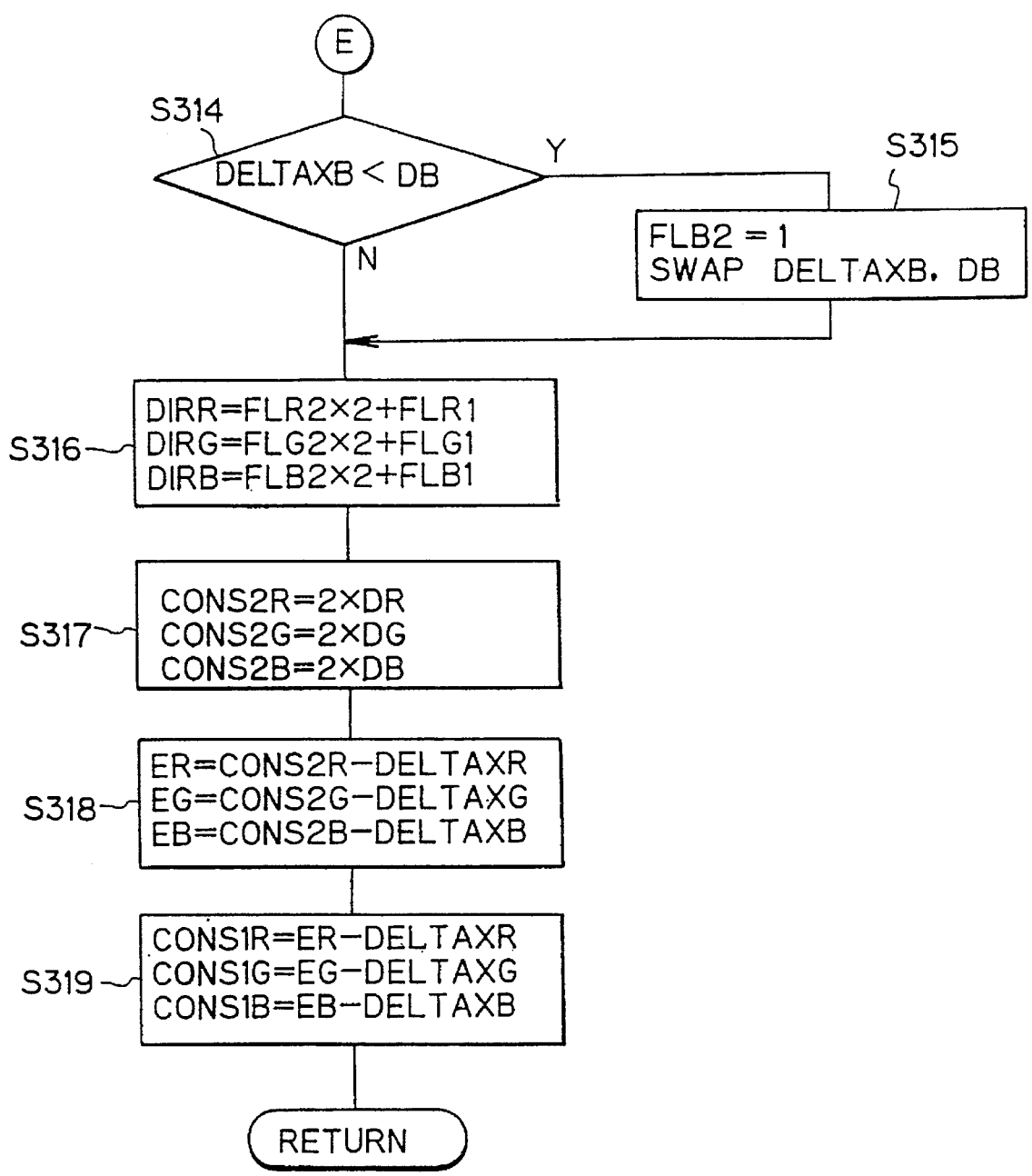
FIG. 27 is a flow chart for explaining the operation of the polygonal image-drawing processor n the second embodiment of the present invention.

In the step S21, a subroutine DDA2 is called. As shown in FIG. 21, in the subroutine DDA2, an incremental or decremental operation about a registered value of the X-register or the Y-register is performed by the digital differential analysis (DDA) with respect to the linear directional vector (DIR). When the subroutine DDA2 is completely executed, it proceeds to a step S22.

In the step S22, E=E+CONS1 is calculated on the basis of the Bresenham algorithm and this calculated value is stored to the E-register and it proceeds to a step S23.

In the step S23, the registered value of the flag register FLX is set to value "1" and it proceeds to a step S25.

In a step S24, E=E+CONS2 is calculated on the basis of the Bresenham algorithm and this calculated value is stored to the E-register and it proceeds to the step S25.

As mentioned above, a condition for writing one dot with respect to one Y address is judged in the step S25. It proceeds to a step S26 from the step S25 except that the registered value of the FLX register is equal to zero and a first lower bit of the linear directional vector (DIR) is equal to zero. In the step S26, a subroutine POUT3a is called and executed. When the registered value of the FLX register is equal to zero and the first lower bit of the linear directional vector (DIR) is equal to zero, it proceeds to a step S27. In an example shown in FIG. 11a, the value of the linear directional vector DIR is equal to zero so that the subroutine POUT3a is called in only positions of dots shown by hatching only when the registered value of the FLX register is equal to one. In FIG. 11b, the value of the linear directional vector DIR is equal to one so that the subroutine POUT3a is executed with respect to all the dots. When the subroutine POUT3a is completely executed, it proceeds to the step S27.

In the step S27, a counting value of the C1 counter is compared with a registered value of the DELTAX register. When the counting value of the C1 counter is smaller than the registered value of the DELTAX register, no line segment processing is completed on one side of the polygon. Accordingly, it is returned to the step S17 from the step S27 and the above-mentioned operations are repeatedly performed.

In the step S27, when the counting value of the C1 counter is equal to or greater than the registered value of the DELTAX register, the line segment processing is completed on the above one side of the polygon so that it proceeds to a step S28.

In the step S28, an incremental operation is performed with respect to a counting value of an I-counter and it proceeds to a step S29.

In the step S29, when the counting value of the I-counter is equal to or greater than 4, it proceeds to a step S30. In the step S30, an incremental operation is performed with respect to a counter I0 for counting the number of polygons and it proceeds to a step S31.

In the step S31, a counting value of the counter I0 is compared with a registered value of the register NM. When the counting value of the counter I0 is smaller than the registered value of the register NM, there is a polygon which is not completely processed. Accordingly, it is returned to the step S2 from the step S31 and the above-mentioned operations are repeatedly performed.

In contrast to this, when the counting value of the counter I0 is greater than the registered value of the register NM, all the polygons are completely processed so that the operation of the polygonal image-drawing processor is completed.

A polygonal image-drawing processor in a second embodiment of the present invention will next be described with reference to FIGS. 12 to 15 and FIGS. 22 to 37.

Figure 12:
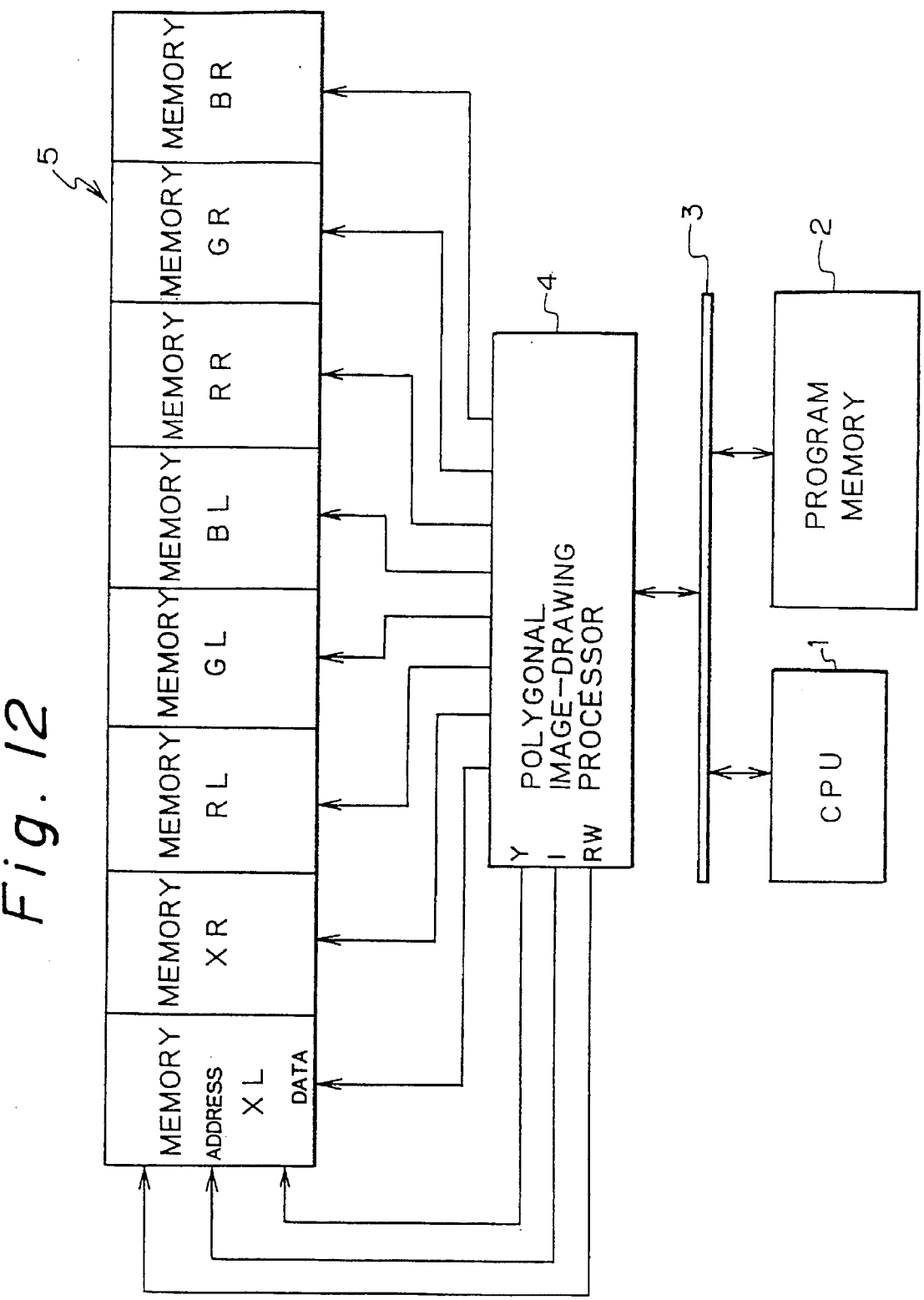
FIG. 12 is a block diagram of a system using a polygonal image-drawing processor in accordance with a second embodiment of the present invention.
Figure 13:
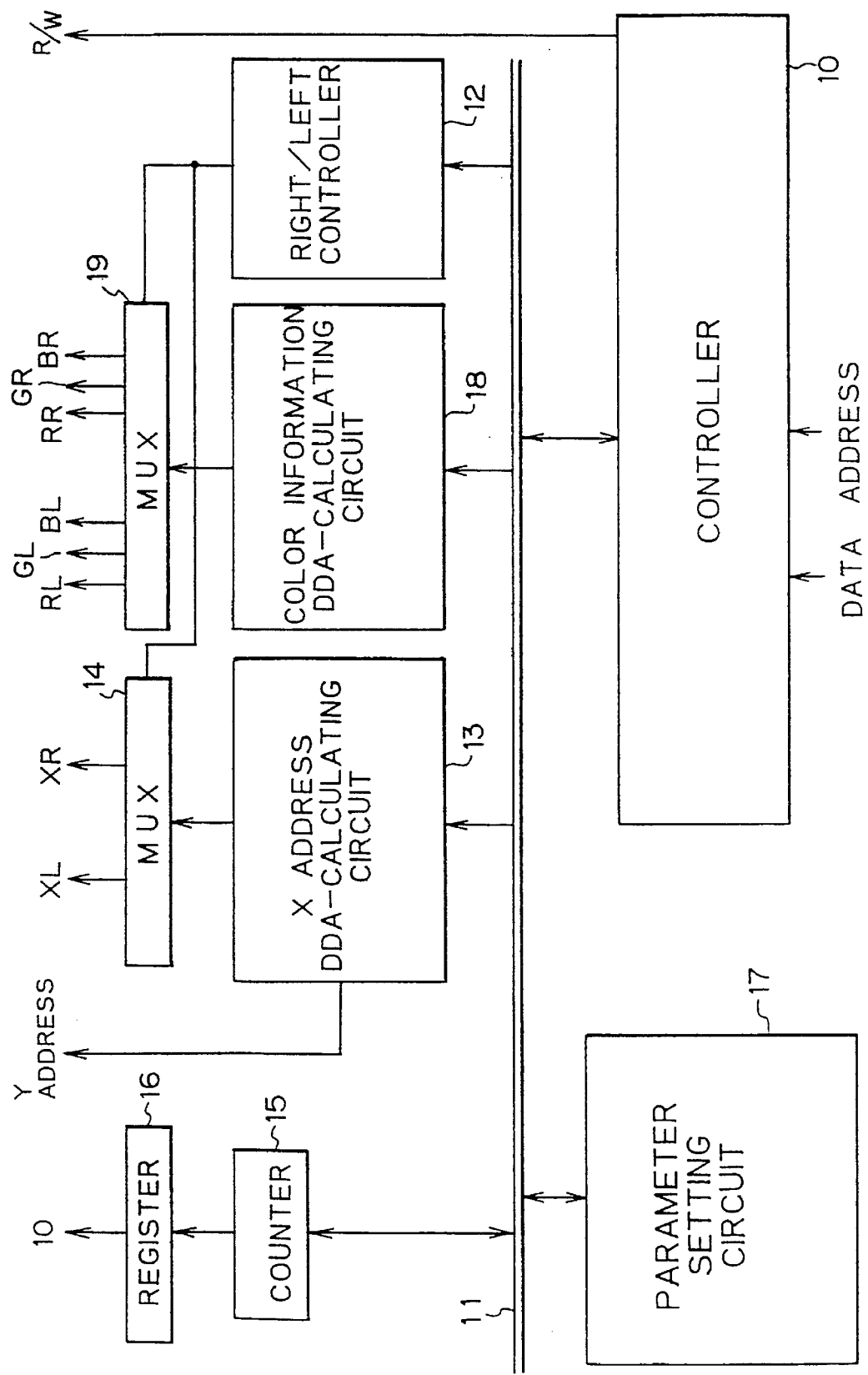
FIG. 13 is a block diagram showing a main portion of the polygonal image-drawing processor in the second embodiment of the present invention.
Figure 14C:
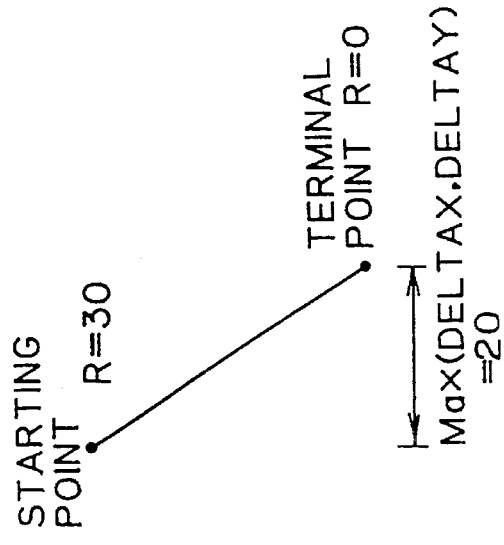
FIGS. 14a to 14d are diagrams showing respective conditions for making a digital differential analysis with respect to color information.
Figure 14D:
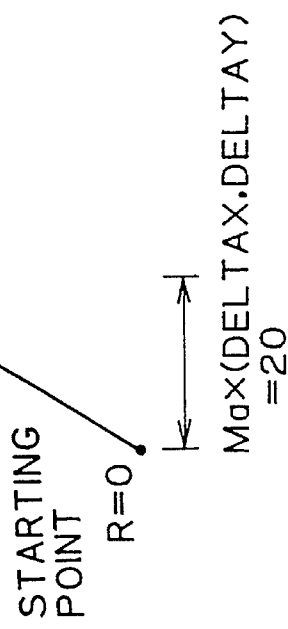
Figure 14A:
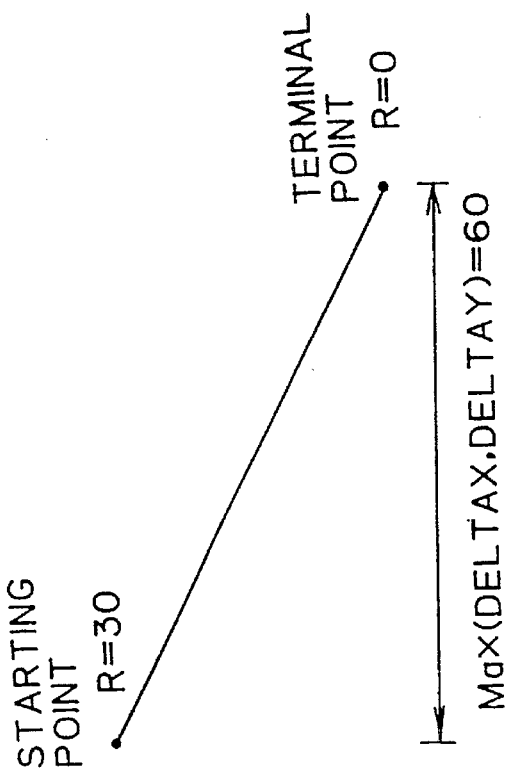
Figure 14B:
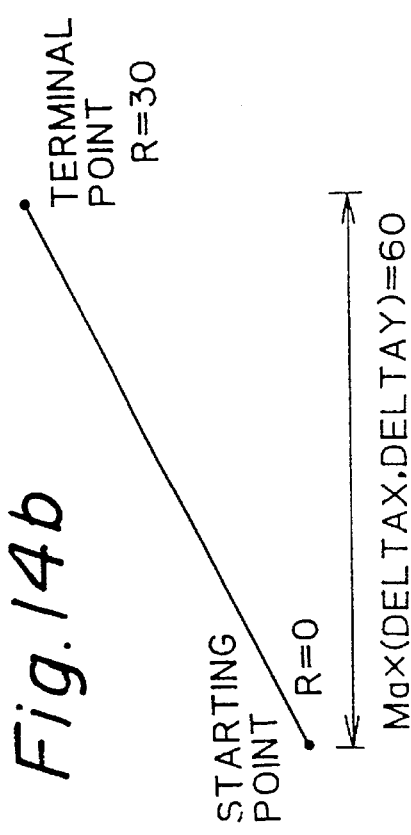

FIG. 12 is a block diagram of a system using the polygonal image-drawing processor in the second embodiment of the present invention. FIG. 13 is a block diagram showing a main portion of the polygonal image-drawing processor in the second embodiment of the present invention. In these figures, the same constructional portions as the first embodiment are designated by the same reference numerals.

In this second embodiment of the present invention, color information of red (R), green (G) and blue (B) with respect to each of dots are additionally provided in the first embodiment. The construction of the polygonal image-drawing processor shown in FIG. 12 is different from that shown in FIG. 6 with respect to an image memory 5. The other constructional portions are similar to those in the first embodiment shown in FIG. 6 and an explanation thereof is therefor omitted in the following description.

This image memory 5 is formed in formats shown in the following Tables 5 and 6.

TABLE 5

| horizontal scanning line Y address | polygon 1 left-handed intersection point | right-handed intersection point | ... | polygon n right-handed intersection point |
|---|---|---|---|---|
| 1 | X address at image-drawing starting point | X address at image-drawing terminal point | ... | X address at image-drawing terminal point |
| 2 | X address at image-drawing starting point | X address at image-drawing terminal point | ... | X address at image-drawing terminal point |
| 3 | X address at image-drawing starting point | X address at image-drawing terminal point | ... | X address at image-drawing terminal point |
| . | . | . | | . |
| . | . | . | | . |
| . | . | . | | . |
| 400 | X address at image-drawing starting point | X address at image-drawing terminal point | ... | X address at image-drawing terminal point |

TABLE 6

| horizontal scanning line Y address | polygon 1 left-handed intersection point | right-handed intersection point | ... | polygon n right-handed intersection point |
|---|---|---|---|---|
| 1 | color information at image-drawing starting point | color information at image-drawing starting point | ... | color information at image-drawing starting point |
| 2 | color information at image-drawing starting point | color information at image-drawing starting point | ... | color information at image-drawing starting point |
| 3 | color information at image-drawing starting point | color information at image-drawing starting point | ... | color information at image-drawing starting point |
| . | . | . | | . |
| . | . | . | | . |
| . | . | . | | . |
| 400 | color information at image-drawing starting point | color information at image-drawing starting point | ... | color information at image-drawing starting point |

In the above Tables 5 and 6, Y addresses correspond to horizontal scanning lines. In these formats, values of X addresses at a left-handed intersection point (XL) and a right-handed intersection point (XR) of each of polygons 1 to n are written to the image memory 5 with respect to Y addresses 1 to 400 respectively corresponding to scanning lines 1 to 400. The left-handed intersection point (XL) shows an X address at an image-drawing starting point on a scanning line. The right-handed intersection point (XR) shows an X address at an image-drawing terminal point on the scanning line.

As shown in the Table 6, color information at the image-drawing starting point is written to the image memory 5 at the left-handed intersection point. Color information at the image-drawing terminal point is written to the image memory 5 at the right-handed intersection point.

As mentioned above, the formats of the image memory 5 are formed such that only the color information and intersection point information on each of sides of the respective polygons 1 to n are written to the image memory 5. Accordingly, a small amount of information is written to the image memory 5 so that it is possible to reduce a capacity of the image memory 5. Further, an amount of information read out of the image memory 5 can be reduced so that no memory having a high reading speed is required.

The polygonal image-drawing processor in the second embodiment of the present invention will next be described with reference to FIG. 13. In the polygonal image-drawing processor in the second embodiment, a color information address DDA-calculating circuit 18 and a multiplexer 19 are additionally disposed in the above polygonal image-drawing processor shown in FIG. 7. Accordingly, the same constructional portions as those in FIG. 7 are designated by the same reference numerals and an explanation thereof is therefor omitted in the following description.

The color information address DDA-calculating circuit 18 calculates color information on each of polygonal sides by a digital differential analysis. Namely, the color information address DDA-calculating circuit 18 makes the digital differential analysis with respect to the color information about each of dots at end points of a polygonal side from the color information of red, green and blue at starting and terminal points on the polygonal side. A numerical value of the color information corresponding to Y and X addresses is outputted from the color information address DDA-calculating circuit 18 to the multiplexer 19. Namely, a smooth shading operation is performed every color of red, green and blue by the color information at the starting and terminal points on the polygonal side.

An operation of the multiplexer 19 is controlled by a left/right controller 12. The multiplexer 19 writes the numerical value of the color information from the color information address DDA-calculating circuit 18 to one of writing regions of the image memory 5 for the right-handed intersection point XR and the left-handed intersection point XL.

With respect to the above-mentioned polygons shown in FIG. 10, the color information of red, green and blue are added to respective end point information in the second embodiment of the present invention.

The end point information on each of sides of a first polygon are provided as follows.

(X11, Y11,R11,G11,B11)=(5,2,255,255,255), (X21, Y21,R21,G21,B21)=(1,3,255,0,0), (X31, Y31,R31,G31,B31)=(2,11,0,255,0), (X41, Y41,R41,G41,B41)=(7,10,0,0,255)

The end point information on each of sides of a second polygon are provided as follows.

(X12, Y12,R12,G12,B12)=(7,2,255,0,0), (X22, Y22,R22,G22,B22)=(2,7,0,255,0)

(X32, Y32,R32,G32,B32)=(11,11,0,0,255), (X42, Y42,R42,G42,B42)=(12,5,255,255,255)

The respective sides of each of the polygons are divided into left-handed or right-handed sides thereof by the end point information on the respective polygonal sides and a right-handed or left-handed rotation of each of the polygons.

As mentioned above, in the case of the first polygon, the left-handed sides of the first polygon are constructed by two linear vectors composed of a linear vector provided by (X11, Y11) and (X21, Y21) and a linear vector provided by (X21, Y21) and (X31, Y31). The right-handed sides of the first polygon are constructed by two linear vectors composed of a linear vector provided by (X31, Y31) and (X41, Y41) and a linear vector provided by (X41, Y41) and (X11, Y11).

In the case of the second polygon, the left-handed sides of the second polygon are constructed by two linear vectors composed of a linear vector provided by (X12, Y12) and (X22, Y22) and a linear vector provided by (X22, Y22) and (X32, Y32). The right-handed sides of the second polygon are constructed by two linear vectors composed of a linear vector provided by (X32, Y32) and (X42, Y42) and a linear vector provided by (X42, Y42) and (X12, Y12).

The X address DDA-calculating circuit 13 and the color information DDA-calculating circuit 18 calculate the color information and X addresses with respect to each of Y addresses by the digital differential analysis based on the Bresenham algorithm and the end point information on the respective polygonal sides. Calculated dots on the right-handed polygonal sides are respectively controlled and written to writing regions of the image memory 5 for XR, RR, GR, BR by the multiplexers 14 and 19. Calculated dots on the left-handed polygonal sides are respectively controlled and written to writing regions of the image memory 5 for XL, RL, GL, BL by the multiplexers 14 and 19. The written results with respect to the image memory 5 are shown in the following Tables 7 and 8.

TABLE 7

| Y address | RL1 | GL1 | BL1 | RR1 | GR1 | BR1 |
|---|---|---|---|---|---|---|
| 0 | | | | | | |
| 1 | | | | | | |
| 2 | 255 | 191 | 191 | 255 | 255 | 255 |
| 3 | 255 | 0 | 0 | 223 | 223 | 255 |
| 4 | 223 | 32 | 0 | 191 | 191 | 255 |
| 5 | 191 | 64 | 0 | 159 | 159 | 255 |
| 6 | 159 | 95 | 0 | 127 | 127 | 255 |
| 7 | 127 | 127 | 0 | 95 | 95 | 255 |
| 8 | 95 | 159 | 0 | 63 | 63 | 255 |
| 9 | 64 | 191 | 0 | 31 | 31 | 255 |
| 10 | 32 | 223 | 0 | 0 | 0 | 255 |
| 11 | 0 | 255 | 0 | 0 | 127 | 127 |
| 12 | | | | | | |

TABLE 8

| Y address | RL2 | GL2 | BL2 | RR2 | GR2 | BR2 |
|---|---|---|---|---|---|---|
| 0 | | | | | | |
| 1 | | | | | | |
| 2 | 255 | 0 | 0 | 255 | 0 | 0 |
| 3 | 204 | 51 | 0 | 255 | 85 | 85 |
| 4 | 153 | 102 | 0 | 255 | 170 | 170 |
| 5 | 102 | 153 | 0 | 255 | 255 | 255 |

TABLE 8-continued

| Y address | RL2 | GL2 | BL2 | RR2 | GR2 | BR2 |
| --- | --- | --- | --- | --- | --- | --- |
| 6 | 51 | 204 | 0 | 212 | 212 | 255 |
| 7 | 0 | 255 | 0 | 170 | 170 | 255 |
| 8 | 0 | 223 | 32 | 128 | 128 | 255 |
| 9 | 0 | 127 | 128 | 85 | 85 | 255 |
| 10 | 0 | 63 | 192 | 42 | 42 | 255 |
| 11 | 0 | 23 | 232 | 0 | 0 | 255 |
| 12 | | | | | | |

In the above Tables 7 and 8, the X addresses with respect to each of the dots are equal to those shown in the above Table 4.

As mentioned above, in the second embodiment, the left-handed intersection point (XL) is used as an X address at an image-drawing starting point on a scanning line and the right-handed intersection point (XR) is used as an X address at an image-drawing terminal point on the scanning line. Accordingly, as shown in FIG. 10, when there are a plurality of X addresses with respect to the same Y address, the operation of the polygonal image-drawing processor is controlled such that only the X address of an outermost picture element of the polygon is written to the image memory 5. Namely, as shown in FIGS. 9a and 9b, in the case of a linear directional vector, an outermost dot can be determined by this linear directional vector and the right-handed or left-handed rotation thereof. Only the X address of this outermost dot is written to the image memory 5. For example, in FIG. 10, there are three dots of X addresses 1, 2 and 3 with respect to Y address 1. In this case, only the outermost X address 1 is written to the image memory 5.

As shown in the Tables 4, 7 and 8, the X addresses at the left-handed intersection point XL and the right-handed intersection point XR and the color information RR, GR, BR, RL, GL, BL are written to the the image memory in accordance with the Y addresses of each of the polygons. Then, the left-handed intersection point XL is used as an X address at the image-drawing starting point on the scanning line by an unillustrated CRT display based on data with respect to the left-handed intersection point XL and the right-handed intersection point XR read out of the image memory. After this left-handed intersection point XL, a coloring operation is performed until the right-handed intersection point XR of the X address at the image-drawing terminal point based on the color information shown in the Tables 7 and 8.

When a smooth shading operation is performed in a scanning direction in a scanning operation of the CRT display, the smooth shading operation can be performed with respect to an internal image in addition to the polygonal sides.

In the above polygonal image-drawing processor, the information read out of the image memory 5 are composed of only the color information of a polygon and information at the left-handed intersection point XL and the right-handed intersection point XR on the scanning line. Accordingly, it is sufficient to construct the image memory 5 by a dynamic random access memory (DRAM), etc. having a reading speed such as about 200 ns.

The operation of the polygonal image-drawing processor in the second embodiment of the present invention will next be described with reference to flow charts shown in FIGS. 22 to 37.

In steps S201 to S218, parameters for making the digital differential analysis are calculated by a parameter setting circuit 17.

In the step S201, the number of polygons is written to an internal register NM of the parameter setting circuit 17. In this second embodiment, the number of polygons is set to "1" and this number is written to this internal register NM. In a register RL, a right-handed or left-handed rotation is set with respect to side vectors of a polygon as shown in FIGS. 9a and 9b. In this case, number "1" shows the right-handed rotation and number "0" shows the left-handed rotation. Further, number "1" is set in a register SS.

In the step S202, coordinates at two end points on one side of the polygon are respectively set and color information of red, green and blue at starting and terminal points on this one side are respectively set.

In the step S203, a distance between two points is calculated with respect to each of X and Y addresses and the calculated distance is set in registers. Namely, a distance DELTAX=XC2–XC1 between starting and terminal points of an X-coordinate is set in a DELTAX register. A distance DELTAY=YC2–YC1 between starting and terminal points of a Y-coordinate is set in a DELTAY register.

In the step S204, flags FL1, FL2 and FL3 for representing a linear directional vector shown in FIG. 8 by three bits are initialized. In this second embodiment, the flags FL1, FL2 and FL3 are respectively set to 1, 0 and 0.

In the step S205, it is judged whether the distance DELTAY is smaller than zero or not. When the distance DELTAY is smaller than zero, it proceeds to step S205.

In the step S206, the distance DELTAY is multiplied by "–1" to change this distance to a positive value. Further, the flag FL1 is rewritten and set to zero and it proceeds to step S207.

In the step S207, it is judged whether the distance DELTAX is smaller than zero or not. When the distance DELTAX is smaller than zero, it proceeds to step S208. In contrast to this, when the distance DELTAX is greater than zero, it proceeds to step S209.

In the step S208, the distance DELTAX is multiplied by "–1" to change the value thereof in the DELTAX register to a positive value. Further, the flag FL2 is set to "1" and it proceeds to the step S209.

In the step S209, values of the distances DELTAX and DELTAY are compared with each other. When the distance DELTAY is greater than the distance DELTAX, it proceeds to step S210. In contrast to this, when the distance DELTAX is greater than the distance DELTAY, it proceeds to step S211.

In the step S210, the value of the distance DELTAX is exchanged for that of the distance DELTAY. Further, the flag FL3 is set to "1" and it proceeds to the step S211.

In the step S211, a subroutine RGBINT is called, As shown in FIGS. 14a to 14d, the subroutine RGBINT is a routine for calculating a larger value of the distances DELTAX and DELTAY and parameters for making the digital differential analysis with respect to red, green and blue. The subroutine RGBINT will next be described with reference to FIGS. 26 and 27.

In a step S301, FL registers for red, green and blue used to calculate linear directional vectors as shown in FIGS. 14a to 14d are initialized and it proceeds to a step S302.

In the step S302, a difference in brightness between the starting and terminal points is calculated with respect to each of red, green and blue. The calculated difference is set in each of corresponding registers and it proceeds to a step S303.

In the step S303, it is judged whether a registered value of a DR register is smaller than zero or not. When the registered value of the DR register is smaller than zero, it proceeds to a step S304. In the step S304, the registered value of the DR register is multiplied by "−1" to change this value to a positive value. Further, the flag FLR1 is set to "1" and it proceeds to a step S305.

In contrast to this, when the registered value of the DR register is greater than zero in the step S303, it directly proceeds to the step S305 from the step S303.

In the step S305, it is judged whether a registered value of a DG register is smaller than zero or not. When the registered value of the DG register is smaller than zero, it proceeds to a step S306. In the step S306, the registered value of the DG register is multiplied by "−1" to change this value to a positive value. Further, the flag FLG1 is set to "1" and it proceeds to a step S307.

In contrast to this, when the registered value of the DG register is greater than zero in the step S305, it directly proceeds to the step S307 from the step S305.

In the step S307, it is judged whether a registered value of a DB register is smaller than zero or not. When the registered value of the DB register is smaller than zero, it proceeds to a step S308. In the step S308, the registered value of the DB register is multiplied by "−1" to change this value to a positive value. Further, the flag FLB1 is set to "1" and it proceeds to a step S309.

In contrast to this, when the registered value of the DB register is greater than zero in the step S307, it directly proceeds to the step S309 from the step S307.

In the step S309, values of the distances DELTAX calculated in the steps S209 and S210 are respectively set in DELTAXR, DELTAXG and DELTAXB registers and it proceeds to a step S310.

In the step S310, the registered value of the DELTAXR register is compared with the registered value of the DR register. When the registered value of the DELTAXR register is smaller than the registered value of the DR register, it proceeds to a step S311. In the step S311, the registered value of the DELTAXR register is exchanged for that of the DR register. Further, the flag FLR2 is set to "1" and it proceeds to a step S312.

In contrast to this, when the registered value of the DELTAXR register is greater than the registered value of the DR register, it directly proceeds to the step S312 from the step S310.

In the step S312, the registered value of the DELTAXG register is compared with the registered value of the DG register. When the registered value of the DELTAXG register is smaller than the registered value of the DG register, it proceeds to a step S313. In the step S313, the registered value of the DELTAXG register is exchanged for that of the DG register. Further, the flag FLG2 is set to "1" and it proceeds to a step S314.

In contrast to this, when the registered value of the DELTAXG register is greater than the registered value of the DG register, it directly proceeds to the step S314 from the step S312.

In the step S314, the registered value of the DELTAXB register is compared with the registered value of the DB register. When the registered value of the DELTAXB register is smaller than the registered value of the DB register, it proceeds to a step S315. In the step S315, the registered value of the DELTAXB register is exchanged for that of the DB register. Further, the flag FLB2 is set to "1" and it proceeds to a step S316.

In contrast to this, when the registered value of the DELTAXB register is greater than the registered value of the DB register, it directly proceeds to the step S316 from the step S314.

In the step S316, conditional vectors shown in FIGS. 14a to 14d are respectively set in vector registers DIRR, DIRG and DIRB of red, green and blue by the values of the flags calculated in the above steps S310 to S315. Then, it proceeds to a step S317.

In the step S317, parameters CONS2R, CONS2G and CONS2B are respectively calculated on the basis of the Bresenham algorithm and these calculated values are set in corresponding registers of red, green and blue. Then, it proceeds to a step S318.

In the step S318, error parameters ER, EG and EB are respectively calculated on the basis of the Bresenham algorithm and these calculated values are set in corresponding registers of red, green and blue. Then, it proceeds to a step S319.

In the step S319, parameters CONS1R, CONS1G and CONS1B are respectively calculated on the basis of the Bresenham algorithm and these calculated values are set in corresponding registers of red, green and blue, thereby completely executing this subroutine RGBINT. When this subroutine RGBINT is completely executed, it proceeds to a step S212.

In the step S212, a linear directional vector DIR is provided by calculating DIR=FL1×4+FL2×2+FL3 and this calculated value is set in a DIR register.

In a step S213, a parameter CONS2 based on the Bresenham algorithm is provided by calculating CONS2=2× DELTAY. This calculated parameter is set in a CONS2 register.

In a step S214, an error E in the above parameter based on the Bresenham algorithm is provided by calculating E=CONS2−DELTAX and this calculated value is set in an E-register.

In a step S215, a parameter CONS1 based on the Bresenham algorithm is provided by calculating CONS1=E−DELTAX and this calculated value is set in a CONS1 register.

In a step S216, X and Y addresses at the starting point are set in registers X and Y.

In a step 217, color information at the starting point are respectively set in R %, G % and B % registers and the counting value of a counter C1 is initially set to zero.

In a step S218, a subroutine POUT3 is called. This subroutine POUT3 is a routine for writing address values at the left-handed intersection point XL and the right-handed intersection point XR to the image memory. In this subroutine, it is judged whether the polygonal sides are left-handed or right-handed sides, and an operation for writing the address values at the left-handed intersection point XL and the right-handed intersection point XR to the image memory is controlled.

Figure 28:
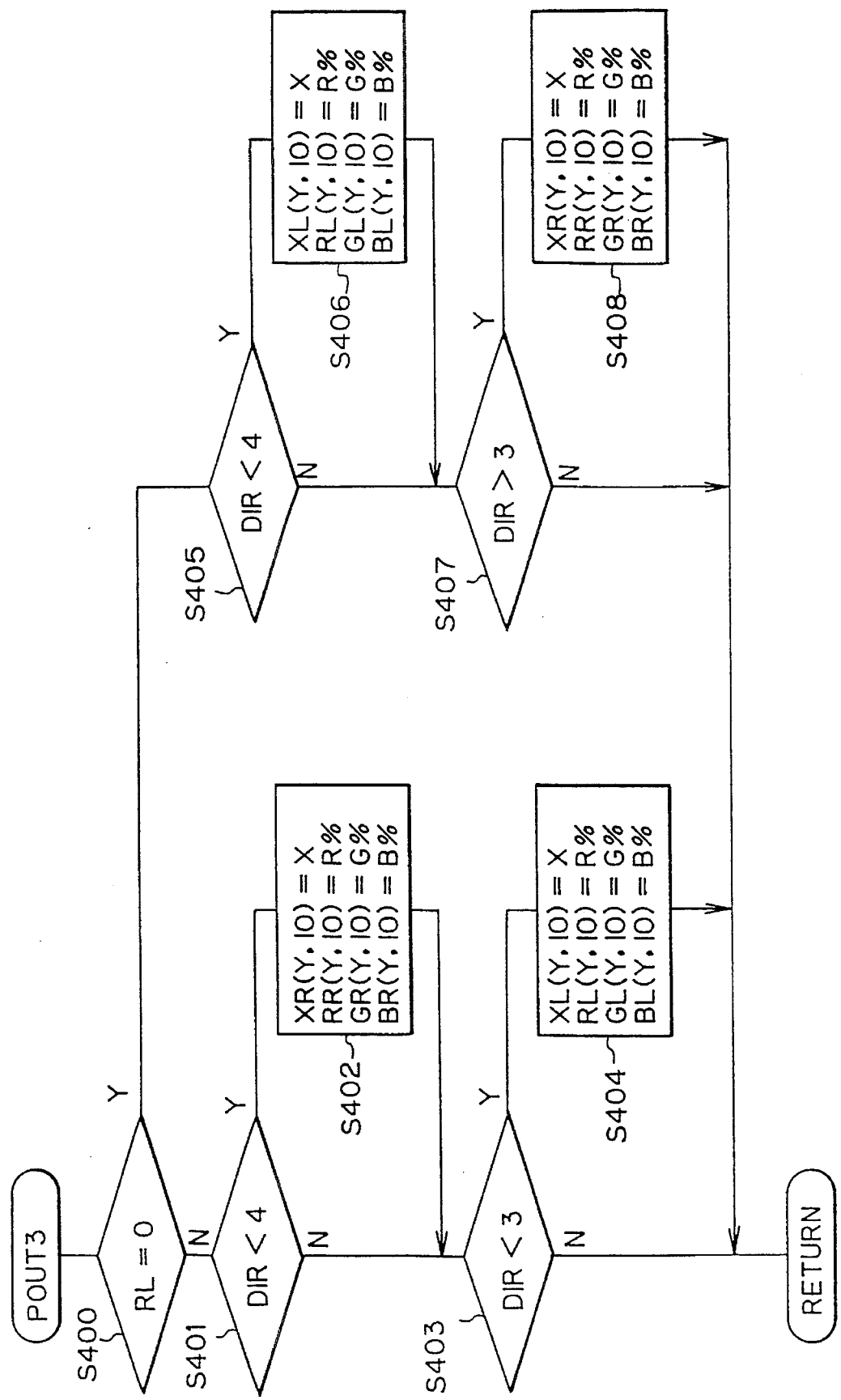
FIG. 28 is a flow chart for explaining the operation of the polygonal image-drawing processor in the second embodiment of the present invention.

FIG. 28 shows the subroutine POUT3. Procedures of the subroutine POUT3 will next be described with reference to FIG. 28.

In a step S400, it is judged whether an RL register shows value "0" or not. When the RL register shows value "0", the linear directional vector of a polygon shows the left-handed rotation. Accordingly, it proceeds to a step S405 to perform processing for the left-handed rotation. In contrast to this, when the RL register shows value "1", it proceeds to a step S401 to perform processing for the right-handed rotation.

In the step S401, it is judged whether or not the value of a linear directional vector DIR is smaller than 4. Namely, it is judged whether or not this linear directional vector is located on the right-handed side of the polygon. When the value of the linear directional vector DIR is smaller than 4, the linear directional vector DIR is located on the right-handed side of the polygon so that it proceeds to a step S402. In this step S402, a registered value of an X-register is written to an address of an XR memory in which Y and I0 addresses are respectively located in upper and lower positions. Further, a registered value of the R % register is written to an address of an RR memory in which Y and I0 addresses are respectively located in upper and lower positions. A registered value of the G % register is written to an address of a GR memory in which Y and I0 addresses are respectively located in upper and lower positions. A registered value of the B % register is written to an address of a BR memory in which Y and I0 addresses are respectively located in upper and lower positions. In contrast to this, when the value of the linear directional vector DIR is equal to or greater than 4, it proceeds to a step S403.

In the step S403, it is judged whether the value of the linear directional vector DIR is greater than 3 or not. Namely, it is judged whether or not this linear directional vector DIR is located on the left-handed side of the polygon. When the value of the linear directional vector DIR is greater than 3, this linear directional vector is located on the left-handed side of the polygon so that it proceeds to a step S404. In the step S404, a registered value of the X-register is written to an address of an XL memory in which Y and I0 addresses are respectively located in upper and lower positions. Further, the registered value of the R % register is written to an address of an RL memory in which Y and I0 addresses are respectively located in upper and lower positions. The registered value of the G % register is written to an address of a GL memory in which Y and I0 addresses are respectively located in upper and lower positions. The registered value of the BX register is written to an address of a BL memory in which Y and I0 addresses are respectively located in upper and lower positions.

When the registered value of the RL register shows value "0" in the step S400, the linear directional vector of the polygon shows the left-handed rotation thereof so that it proceeds to a step S405.

In the step S405, it is judged whether the value of the linear directional vector DIR is smaller than 4 or not. Namely, it is judged whether or not this linear directional vector DIR is located on the left-handed side of the polygon. When the value of the linear directional vector DIR is smaller than 4, this linear directional vector is located on the left-handed side of the polygon so that it proceeds to a step S406. The registered value of the X-register is written to an address of the XL memory in which Y and I0 addresses are respectively located in upper and lower positions. Further, the registered value of the R % register is written to an address of the RL memory in which Y and I0 addresses are respectively located in upper and lower positions. The registered value of the G % register is written to an address of the GL memory in which Y and I0 addresses are respectively located in upper and lower positions. The registered value of the B % register is written to an address of the BL memory in which Y and I0 addresses are respectively located in upper and lower positions. In contrast to this, when the value of the linear directional vector DIR is equal to or greater than 4, it proceeds to a step S407.

In the step S407, it is judged whether the value of the linear directional vector DIR is greater than 3 or not. Namely, it is judged whether or not this linear directional vector DIR is located on the right-handed side of the polygon. When the value of the linear directional vector DIR is greater than 3, this linear directional vector DIR is located on the right-handed side of the polygon so that it proceeds to a step S408. In the step S408, the registered value of the X-register is written to an address of the XR memory in which Y and I0 addresses are respectively located in upper and lower positions. Further, the registered value of the R % register is written to an address of the RR memory in which Y and I0 addresses are respectively located in upper and lower positions. The registered value of the G % register is written to an address of the GR memory in which Y and I0 addresses are respectively located in upper and lower positions. The registered value of the B % register is written to an address of the BR memory in which Y and I0 addresses are respectively located in upper and lower positions.

Then the subroutine POUT3 is completely executed, it proceeds to a step S219.

Procedures after the step S219 are set to make the digital differential analysis based on the X address DDA-calculating circuit 13.

In the step S219, an incremental operation of the counter C1 is performed and it proceeds to a step S220.

In the step 8220, a subroutine DDA1 is called. As shown in FIG. 20, in the subroutine DDA1, an incremental or decremental operation about a registered value of the X-register or the Y-register is performed by the digital differential analysis (DDA) with respect to the linear directional vector (DIR). When the subroutine DDA1 is completely executed, it proceeds to a step S221.

In the step S221, the registered value of a flag register FLX is cleared and set to value "0" and it proceeds to a step S222.

In the step S222, it is judged whether a registered value of the E-register is "0" or not on the basis of the Bresenham algorithm. When the registered value of the E-register is greater than value "0", it proceeds to a step S223. In contrast to this, when the registered value of the E-register is smaller than value "0", it proceeds to a step S226.

In the step S223, a subroutine DDA2 is called. As shown in FIG. 21. in the subroutine DDA2, an incremental or decremental operation about a registered value of the X-register or the Y-register is performed by the digital differential analysis (DDA) with respect to the linear directional vector (DIR). When the subroutine DDA2 is completely executed, it proceeds to a step S224.

In the step S224, E=E+CONS1 is calculated on the basis of the Bresenham algorithm and this calculated value is stored to the E-register and it proceeds to a step S225.

Figure 11A:
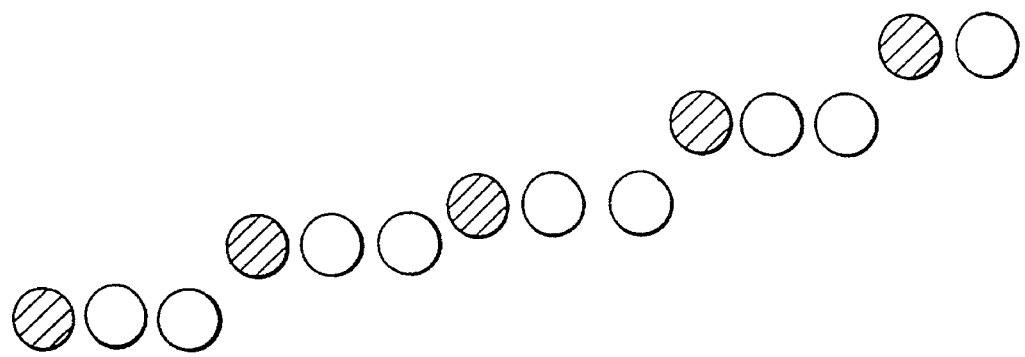
FIGS. 11a and 11b are typical views showing selected positions of dots with respect to the linear directional vectors.
Figure 11B:
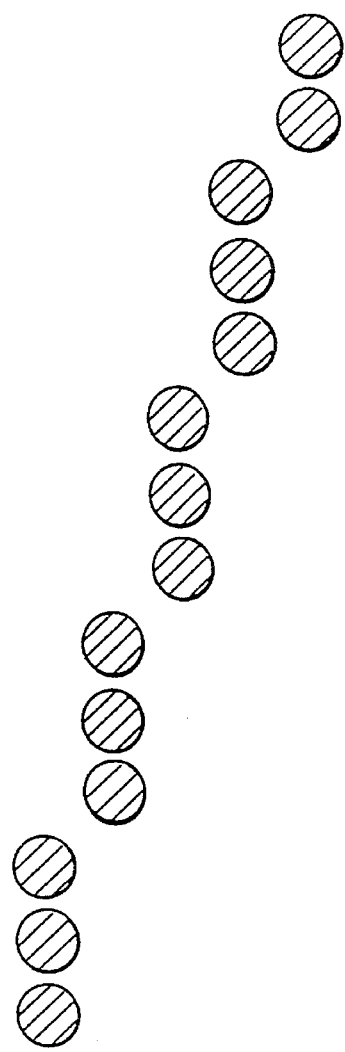

In the step 8225, when the linear directional vector is moved in a direction different from a normal direction as shown by dots illustrated by hatching in FIG. 11a, the registered value of the flag register FLX is set to value "1" and it proceeds to a step S227.

In a step S226, E=E+CONS2 is calculated on the basis of the Bresenham algorithm and this calculated value is stored to the E-register and it proceeds to the step S227.

Figure 29:
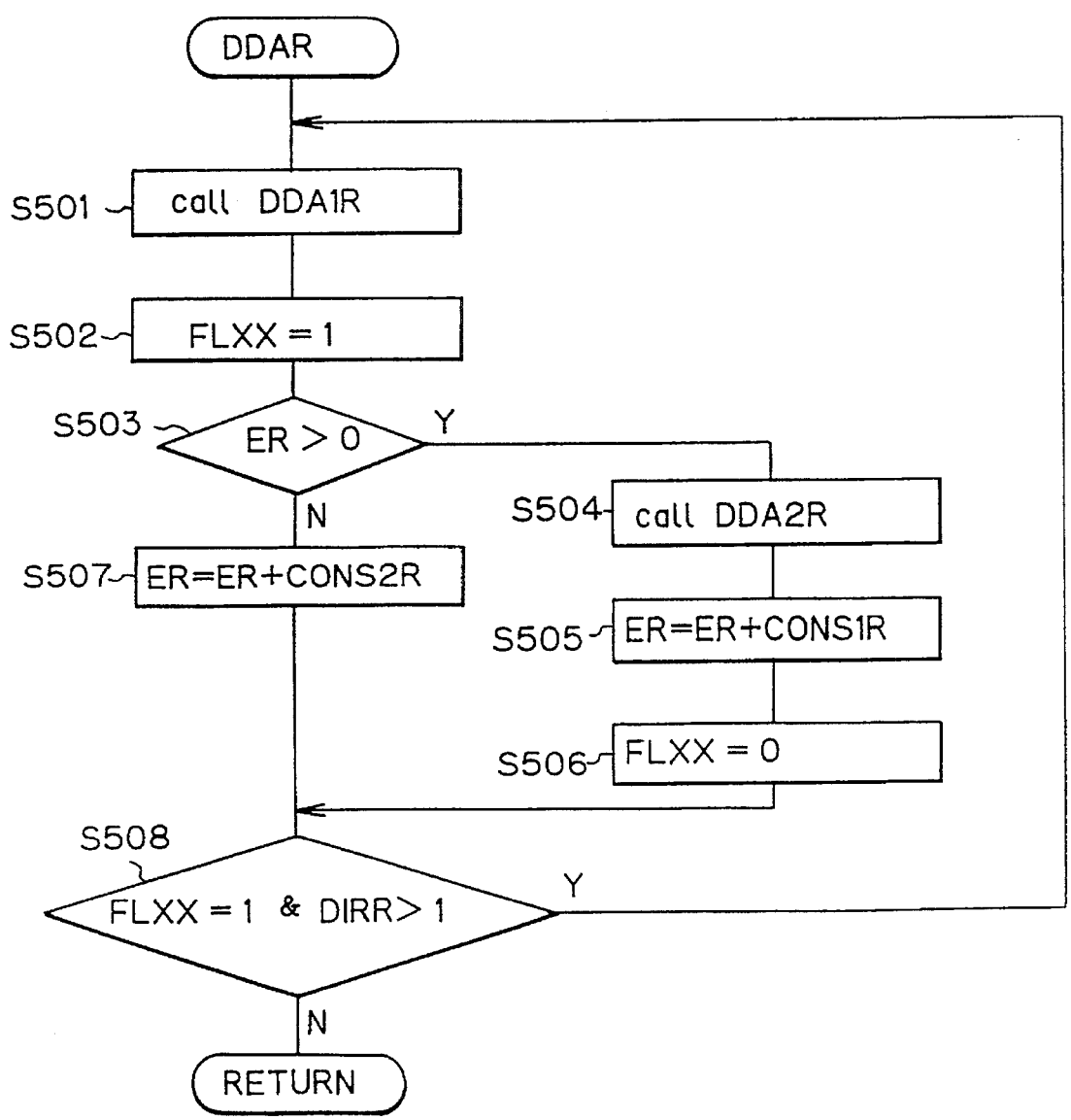
FIG. 29 is a flow chart for explaining the operation of the polygonal image-drawing processor in the second embodiment of the present invention.

In the step S227, a subroutine DDAR is called and executed. This subroutine DDAR is shown in FIG. 29 and will next be described with reference to FIG. 29.

Figure 32:
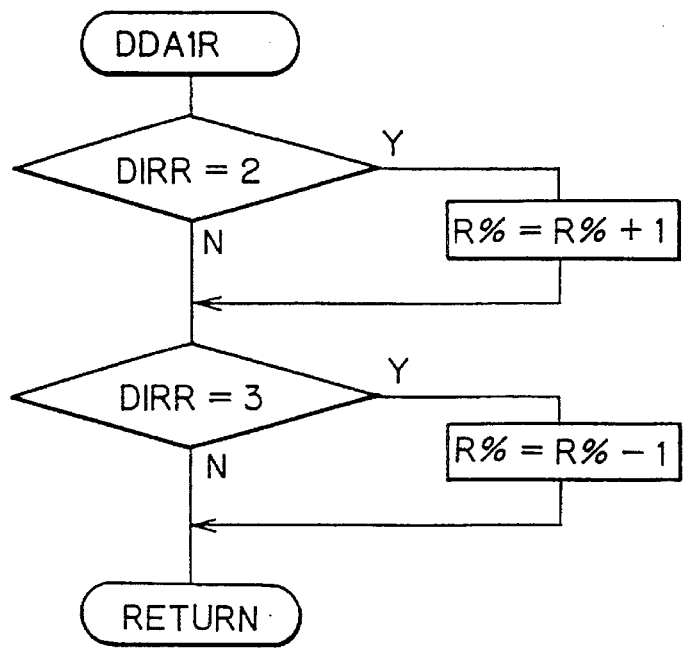
FIG. 32 is a flow chart for explaining the operation of the polygonal image-drawing processor in the second embodiment of the present invention.

As shown in a step S501, a subroutine DDA1R is first called and executed. As shown in FIG. 32, the subroutine DDA1R is executed only when a registered value of the DR register is greater than that of the DELTAX register with respect to linear directional vectors 2 and 3 respectively shown in FIGS. 14c and 14d. Namely, when a difference between starting and terminal points with respect to the color information is positive as in the case of the linear directional vector 2 shown in FIG. 14c, an incremental operation is performed with respect to the R % register. In contrast to this, when the difference between the starting and terminal points with respect to the color information is negative as in the case of the linear directional vector 3 shown in FIG. 14*d*, a decremental operation is performed with respect to the R % register. When the subroutine DDA1R is completely executed, it proceeds to a step S502.

In the step S502, a flag register FLXX is set to "1" and it proceeds to a step S503.

In the step S503, it is judged whether a registered value of an ER register is greater than zero or not on the basis of the Bresenham algorithm. When the registered value of the ER register is greater than zero, it proceeds to a step S504. In contrast to this, when the registered value of the ER register is smaller than zero, it proceeds to a step S507.

Figure 33:
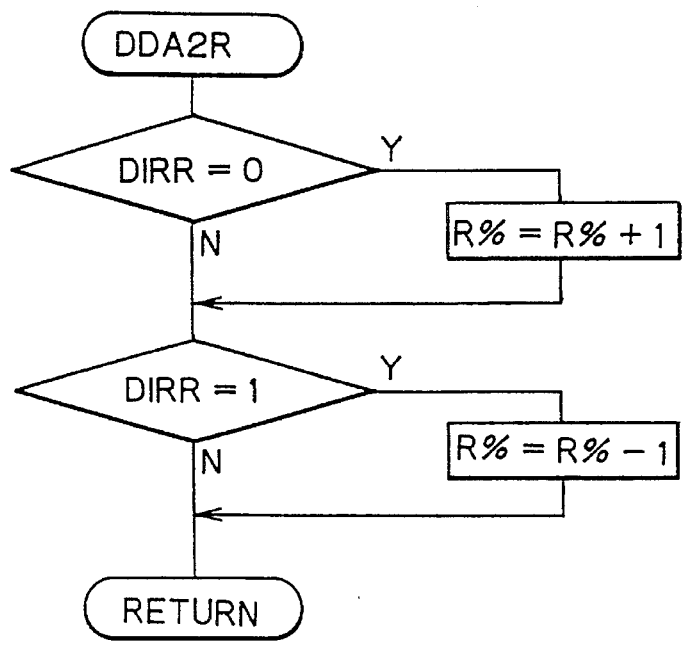
FIG. 33 is a flow chart for explaining the operation of the polygonal image-drawing processor in the second embodiment of the present invention.

In the step S504, a subroutine DDA2R is called and executed. As shown in FIG. 33, the subroutine DDA2R is executed only when a registered value of the DR register is greater than that of the DELTAX register with respect to linear directional vectors 0 and 1 respectively shown in FIGS. 14*a* and 14*b*. Namely, when a difference between starting and terminal points with respect to the color information is positive as in the case of the linear directional vector 0 shown in FIG. 14*a*, the incremental operation is performed with respect to the R % register. In contrast to this, when the difference between the starting and terminal points with respect to the color information is negative as in the case of the linear directional vector 1 shown in FIG. 14*b*, the decremental operation is performed with respect to the R % register. When the subroutine DDA2R is completely executed, it proceeds to a step S505.

In the step S505, an error ER is calculated on the basis of the Bresenham algorithm and this calculated value is set in a corresponding register and it proceeds to a step S506.

In the step S506, the flag register FLXX is set to "1" and it proceeds to a step S508.

When the registered value of the ER register is smaller than zero in the step S503, it proceeds to a step S507. In the step S507, an error ER is calculated on the basis of the Bresenham algorithm and this calculated value is set in a corresponding register and it proceeds to the step S508.

In the step S508, when the registered value of the DR register is greater than that of the DELTAX register, it is returned to the step S501 and the above-mentioned operations are repeatedly performed until the registered value of the flag register FLXX is equal to zero in conformity with memory access with respect to the digital differential analysis about X-Y.

Figure 15A:
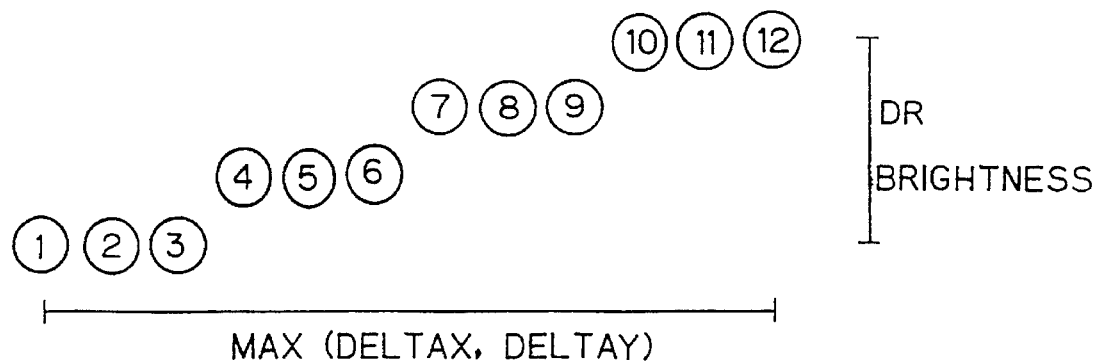
FIGS. 15a and 15b are typical views showing selected positions of color information dots.
Figure 15B:
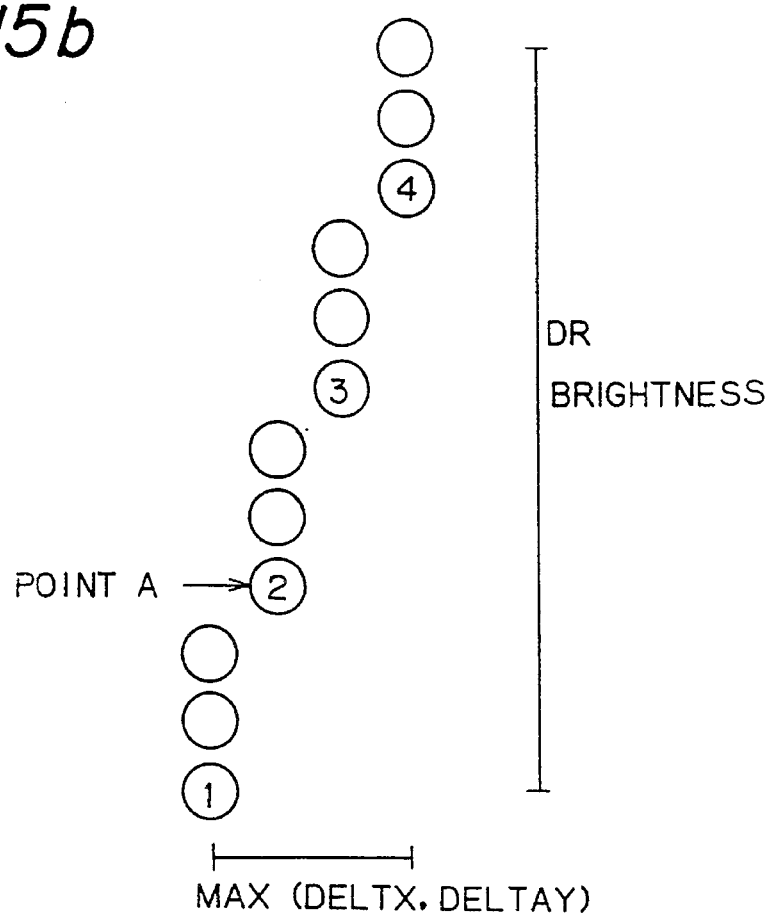
Figure 16:
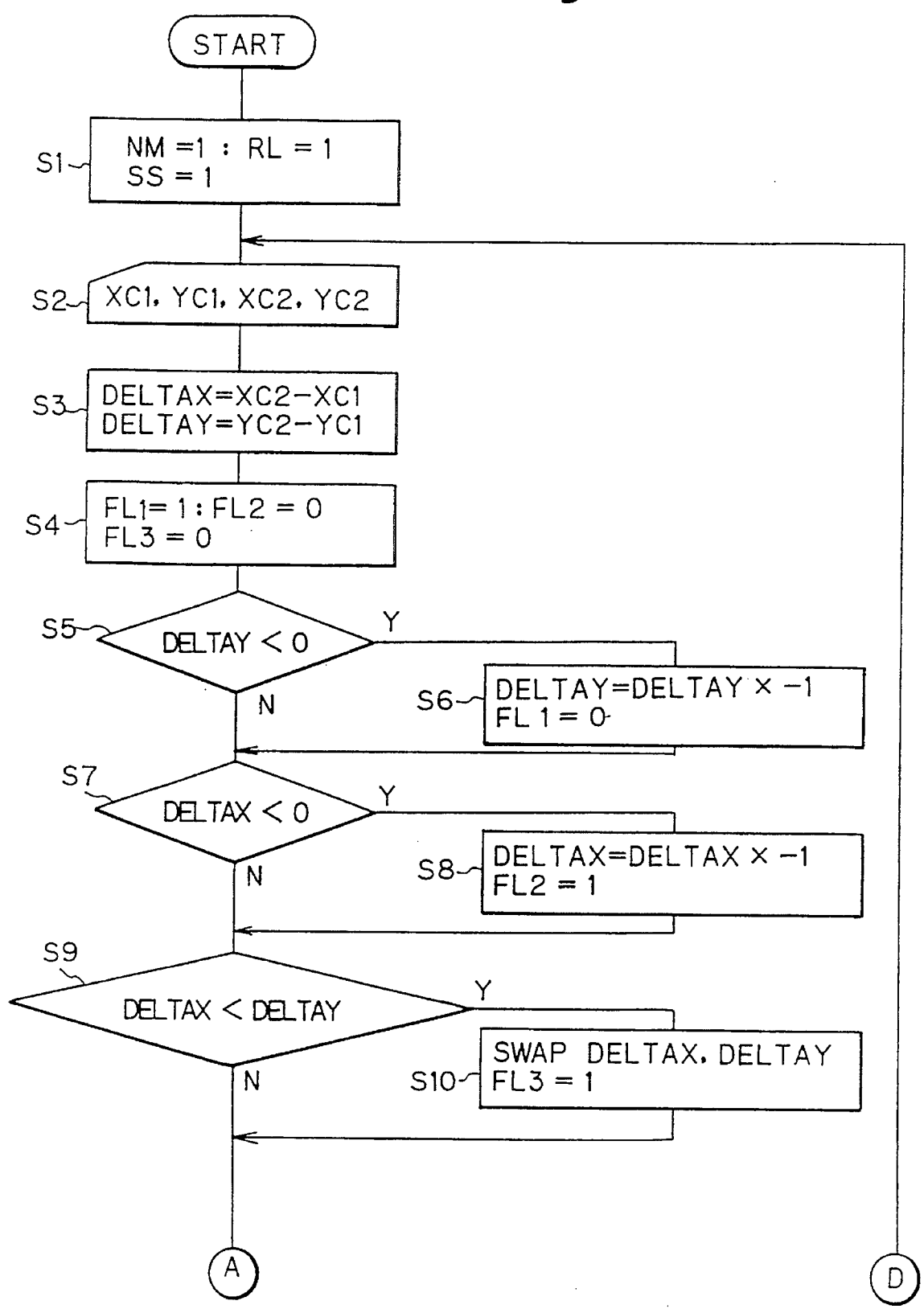
FIG. 16 is a flow chart for explaining an operation of the polygonal image-drawing processor in the first embodiment of the present invention.
Figure 17:
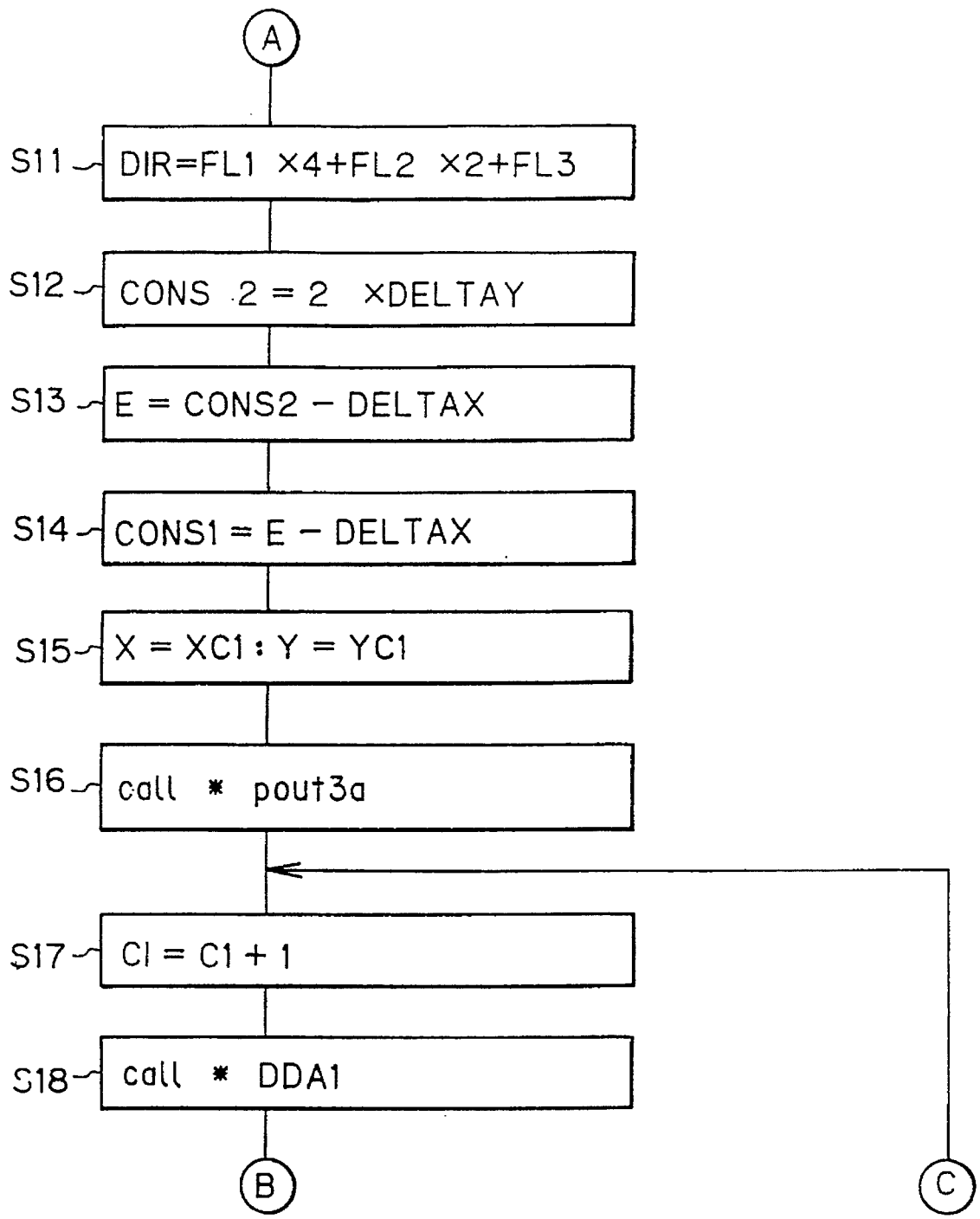
FIG. 17 is a flow chart for explaining the operation of the polygonal image-drawing processor in the first embodiment of the present invention.
Figure 18:
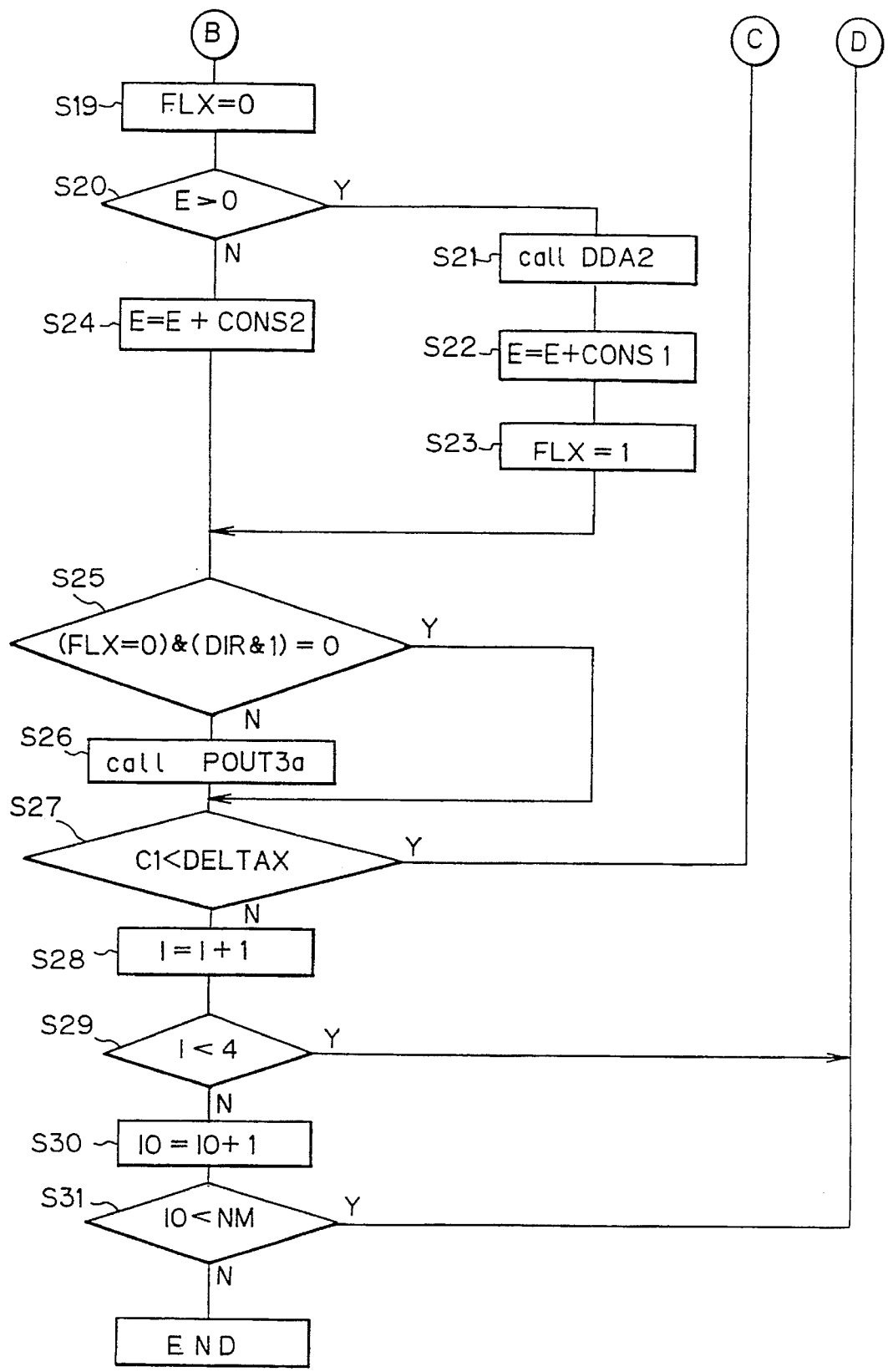
FIG. 18 is a flow chart for explaining the operation of the polygonal image-drawing processor in the first embodiment of the present invention.

FIGS. 15*a* and 15*b* show an example of this processing in the step S508. In FIG. 15*a*, the registered value of a DIRR register is equal to zero. In this case, a shading operation is performed with respect to color information dots as shown by numbers within circles. In FIG. 15*b*, the registered value of the DIRR register is equal to 2. In this case, the shading operation is performed with respect to color information dots as shown by numbers within circles.

When the subroutine DDAR is completely executed, it is returned to a step S228.

Figure 30:
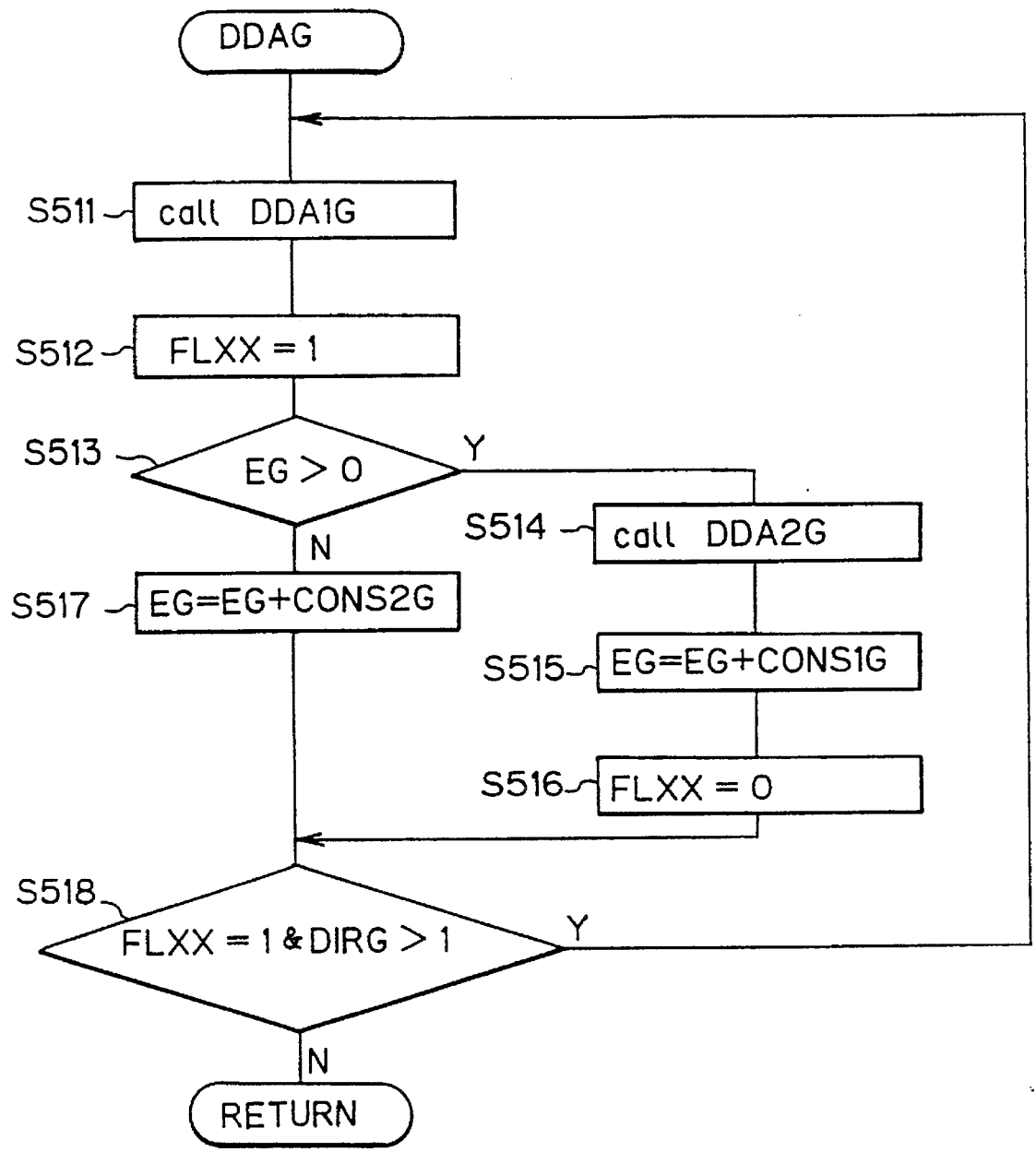
FIG. 30 is a flow chart for explaining the operation of the polygonal image-drawing processor in the second embodiment of the present invention.

In the step S228, a subroutine DDAG is called and executed. This subroutine DDAG is shown in FIG. 30 and will next be described with reference to FIG. 30.

Figure 34:
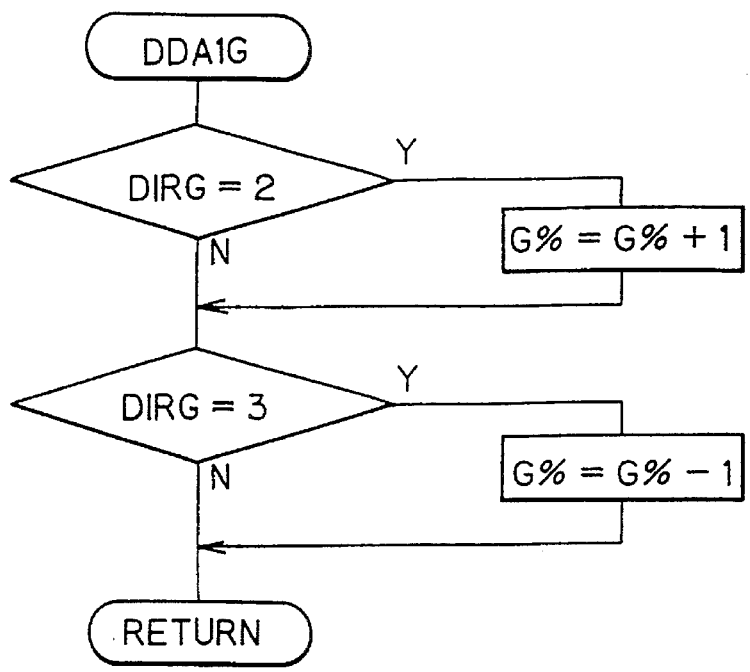
FIG. 34 is a flow chart for explaining the operation of the polygonal image-drawing processor in the second embodiment of the present invention.

As shown in a step S511, a subroutine DDA1G is first called and executed. As shown in FIG. 34, the subroutine DDA1G is executed only when a registered value of the DG register is greater than that of the DELTAX register with respect to the linear directional vectors 2 and 3 respectively shown in FIGS. 14*c* and 14*d*. Namely, when the difference between the starting and terminal points with respect to the color information is positive as in the case of the linear directional vector 2 shown in FIG. 14*c*, an incremental operation is performed with respect to the G % register. In contrast to this, when the difference between the starting and terminal points with respect to the color information is negative as in the case of the linear directional vector 3 shown in FIG. 14*d*, a decremental operation is performed with respect to the G % register. When the subroutine DDA1G is completely executed, it proceeds to a step S512.

In the step S512, the flag register FLXX is set "1" and it proceeds to a step S513.

In the step S513, it is judged whether a registered value of an EG register is greater than zero or not on the basis of the Bresenham algorithm. When the registered value of the EG register is greater than zero, it proceeds to a step S514. In contrast to this, when the registered value of the EG register is smaller than zero, it proceeds to a step S517.

Figure 35:
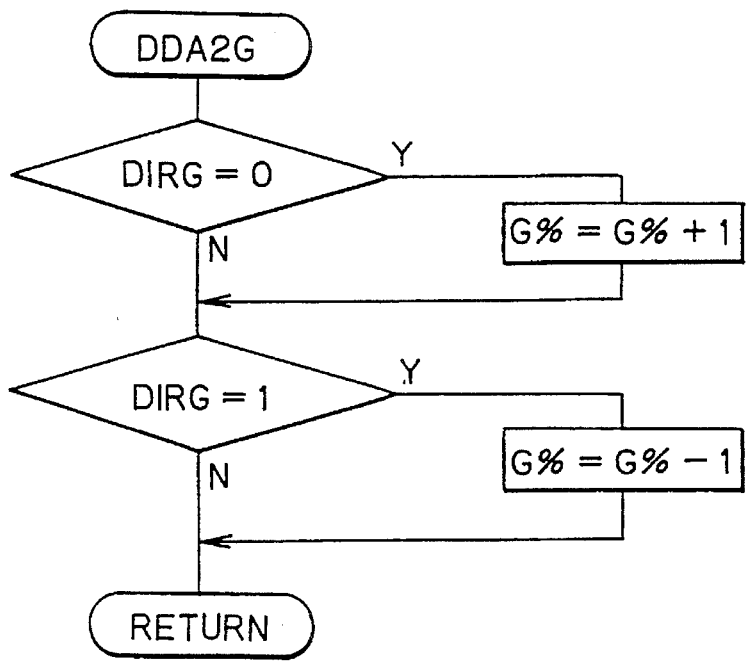
FIG. 35 is a flow chart for explaining the operation of the polygonal image-drawing processor in the second embodiment of the present invention.

In the step S514, a subroutine DDA2G is called and executed. As shown in FIG. 35, the subroutine DDA2G is executed only when a registered value of the DG register is greater than that of the DELTAX register with respect to the linear directional vectors 0 and 1 respectively shown in FIGS. 14*a* and 14*b*. Namely, when the difference between the starting and terminal points with respect to the color information is positive as in the case of the linear directional vector 0 shown in FIG. 14*a*, the incremental operation is performed with respect to the G % register. In contrast to this, when the difference between the starting and terminal points with respect to the color information is negative as in the case of the linear directional vector 1 shown in FIG. 14*b*, the decremental operation is performed with respect to the G % register. When the subroutine DDA2G is completely executed, it proceeds to a step S515.

In the step S515, an error EG is calculated on the basis of the Bresenham algorithm and this calculated value is set in a corresponding register and it proceeds to a step S516.

In the step S516, the flag register FLXX is set to "1" and it proceeds to a step S518.

When the registered value of the EG register is smaller than zero in the step S513, it proceeds to a step S517. In the step S517, an error EG is calculated on the basis of the Bresenham algorithm and this calculated value is set in a corresponding register and it proceeds to the step S518.

In the step S518, when the registered value of the DG register is greater than that of the DELTAX register, it is returned to the step S511 and the above-mentioned operations are repeatedly performed until the registered value of the flag register FLXX is equal to zero in conformity with memory access with respect to the digital differential analysis about X-Y.

When the subroutine DDAG is completely executed, it is returned to a step S229.

Figure 31:
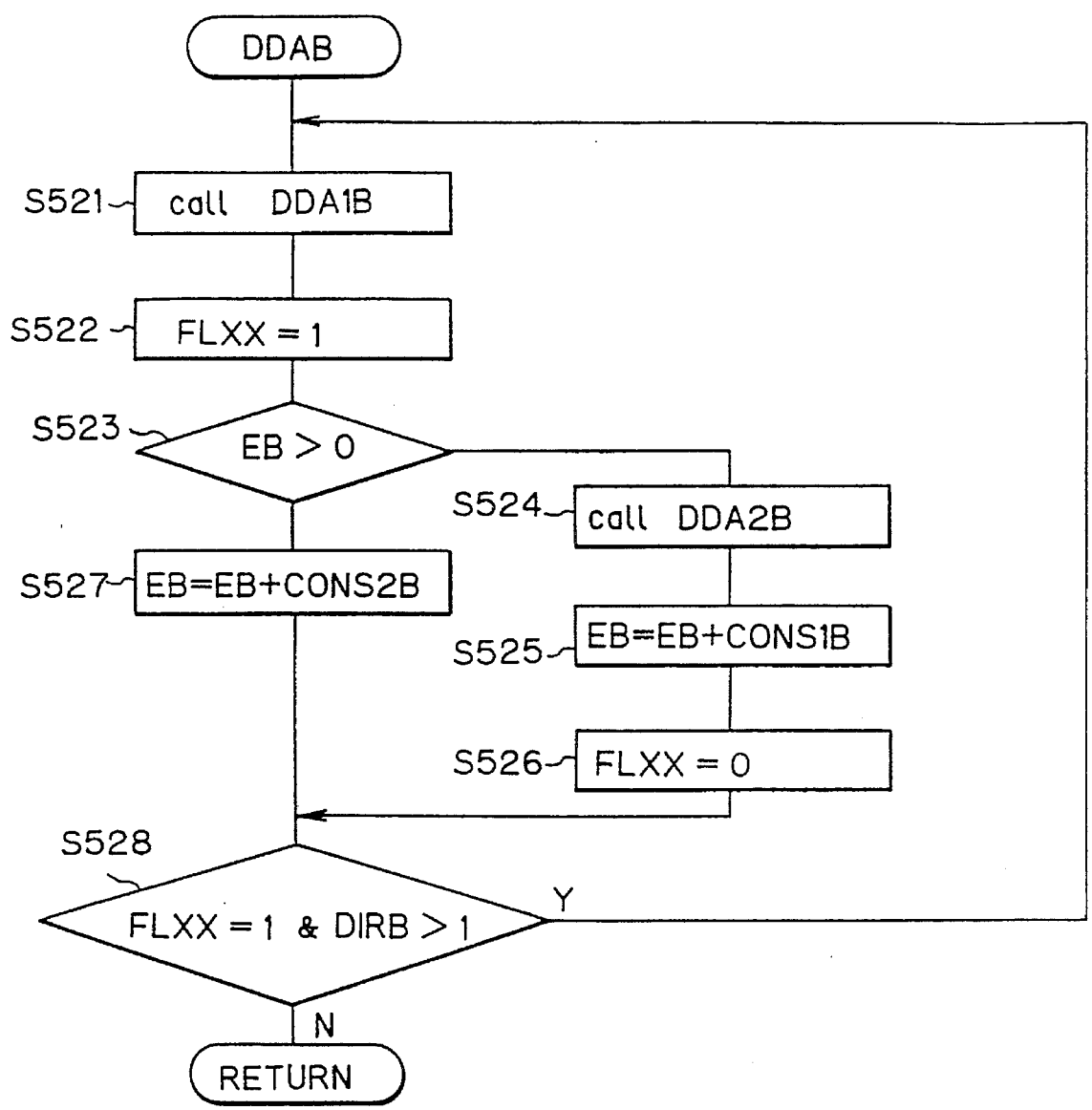
FIG. 31 is a flow chart for explaining the operation of the polygonal image-drawing processor in the second embodiment of the present invention.

In the step S229, a subroutine DDAB is called and executed. This subroutine DDAB is shown in FIG. 31 and will next be described with reference to FIG. 31.

Figure 36:
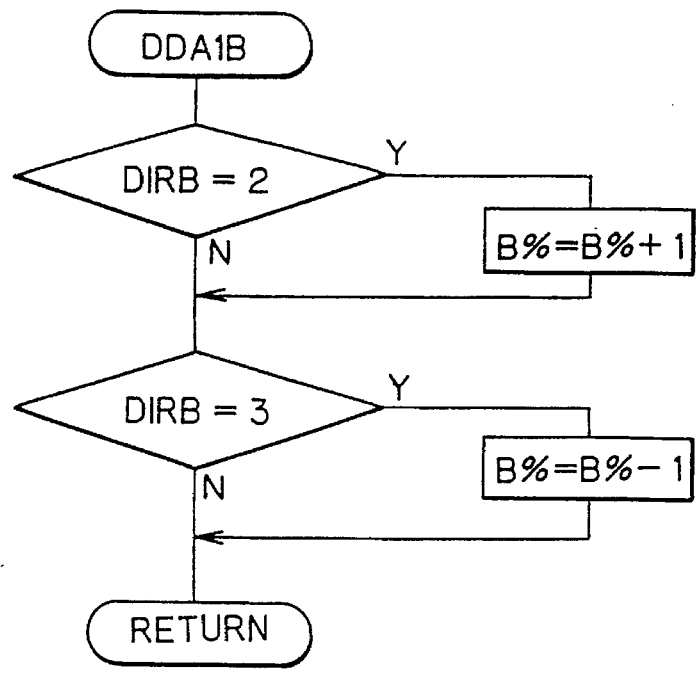
FIG. 36 is a flow chart for explaining the operation of the polygonal image-drawing processor in the second embodiment of the present invention.

As shown in a step S521, a subroutine DDA1B is first called and executed. As shown in FIG. 36, the subroutine DDA1B is executed only when a registered value of the DB register is greater than that of the DELTAX register with respect to the linear directional vectors 2 and 3 respectively shown in FIGS. 14*c* and 14*d*. Namely, when the difference between the starting and terminal points with respect to the color information is positive as in the case of the linear directional vector 2 shown in FIG. 14*c*, an incremental operation is performed with respect to the B % register. In contrast to this, when the difference between the starting and terminal points with respect to the color information is negative as in the case of the linear directional vector 3 shown in FIG. 14*d*, a decremental operation is performed with respect to the B % register. When the subroutine DDA1B is completely executed, it proceeds to a step S522.

In the step S522, the flag register FLXX is set to "1" and it proceeds to a step S523.

In the step S523, it is judged whether a registered value of an EB register is greater than zero or not on the basis of the Bresenham algorithm. When the registered value of the EB register is greater than zero, it proceeds to a step S524. In contrast to this, when the registered value of the EB register is smaller than zero, i t proceeds to a step S527.

Figure 37:
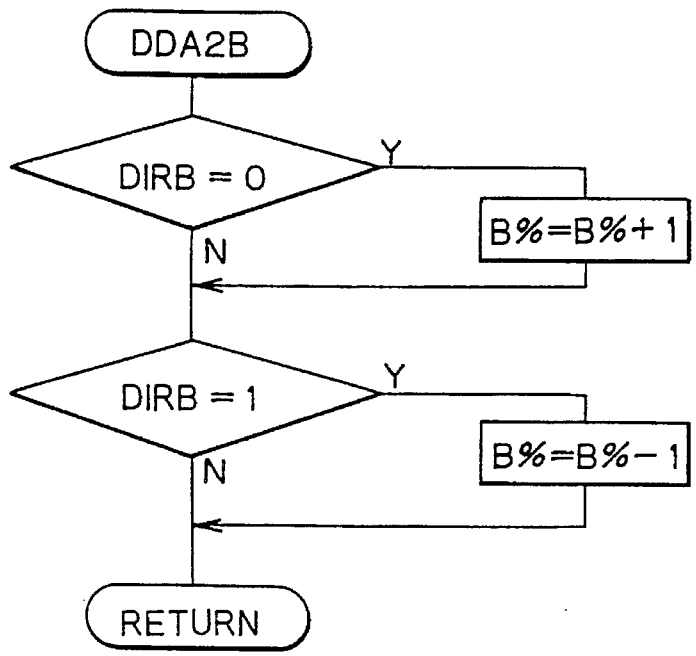
FIG. 37 is a flow chart for explaining the operation of the polygonal image-drawing processor in the second embodiment of the present invention.

In the step S524, a subroutine DDA2B is called and executed. As shown in FIG. 37, the subroutine DDA2B is executed only when a registered value of the DB register is greater than that of the DELTAX register with respect to the linear directional vectors 0 and 1 respectively shown in FIGS. 14a and 14b. Namely, when the difference between the starting and terminal points with respect to the color information is positive as in the case of the linear directional vector 0 shown in FIG. 14a, the incremental operation is performed with respect to the B % register. In contrast to this, when the difference between the starting and terminal points with respect to the color information is negative as in the case of the linear directional vector 1 shown in FIG. 14b, the decremental operation is performed with respect to the B % register. When the subroutine DDA2B is completely executed, it proceeds to a step S525.

In the step S525, an error EB is calculated on the basis of the Bresenham algorithm and this calculated value is set in a corresponding register and it proceeds to a step S526.

In the step S526, the flag register FLXX is set to "1" and it proceeds to a step S528.

When the registered value of the EB register is smaller than zero in the step S523, it proceeds to the step S527. In the step S527, an error EB is calculated on the basis of the Bresenham algorithm and this calculated value is set in a corresponding register and it proceeds to the step S528.

In the step S528, when the registered value of the DB register is greater than that of the DELTAX register, it is returned to the step S521 and the above-mentioned operations are repeatedly performed until the registered value of the flag register FLXX is equal to zero in conformity with memory access with respect to the digital differential analysis about X-Y.

When the subroutine DDAB is completely executed, it is returned to a step S230.

As mentioned above, the step S230 is a step for judging a condition for writing one dot to one Y address. It proceeds to a step S231 from the step S230 except that the registered value of the FLX register is equal to zero and a first lower bit of the linear directional vector (DIR) is equal to zero. In the step S231, a subroutine POUT3 is called and executed. When the registered value of the FLX register is equal to zero and the first lower bit of the linear directional vector (DIR) is equal to zero, it proceeds to a step S232. In the example shown in FIG. 11a, the value of the linear directional vector DIR is equal to zero so that the subroutine POUT3 is called in only positions of dots shown by hatching only when the registered value of the FLX register is equal to one. In FIG. 11b, the value of the linear directional vector DIR is equal to one so that the subroutine POUT3 is executed with respect to all the dots. When the subroutine POUT3 is completely executed, it proceeds to the step S232.

In the step S232, a counting value of the C1 counter is compared with a registered value of the DELTAX register. When the counting value of the C1 counter is smaller than the registered value of the DELTAX register, no line segment processing is completed on one side of the polygon. Accordingly, it is returned to the step S219 from the step S232 and the above-mentioned operations are repeatedly performed.

In the step S232, when the counting value of the C1 counter is equal to or greater than the registered value of the DELTAX register, the line segment processing is completed on the above one side of the polygon so that it proceeds to a step S233.

In the step S233, an incremental operation is performed with respect to the counting value of an I-counter and it proceeds to a step S234.

In the step S234, when the counting value of the I-counter is equal to or greater than 4, it proceeds to a step S235. In the step S235, an incremental operation is performed with respect to a counter I0 for counting the number of polygons and it proceeds to a step S236.

In the step S236, a counting value of the counter I0 is compared with a registered value of the register NM. When the counting value of the counter I0 is smaller than the registered value of the register NM, there is a polygon which is not completely processed. Accordingly, it is returned to the step S202 from the step S236 and the above-mentioned operations are repeatedly performed.

In contrast to this, when the counting value of the counter I0 is greater than the registered value of the register NM, all the polygons are completely processed so that the operation of the polygonal image-drawing processor is completed.

A polygonal image-drawing processor in accordance with a third embodiment of the present invention will next be described with reference to FIGS. 38 to 40.

Figure 38:
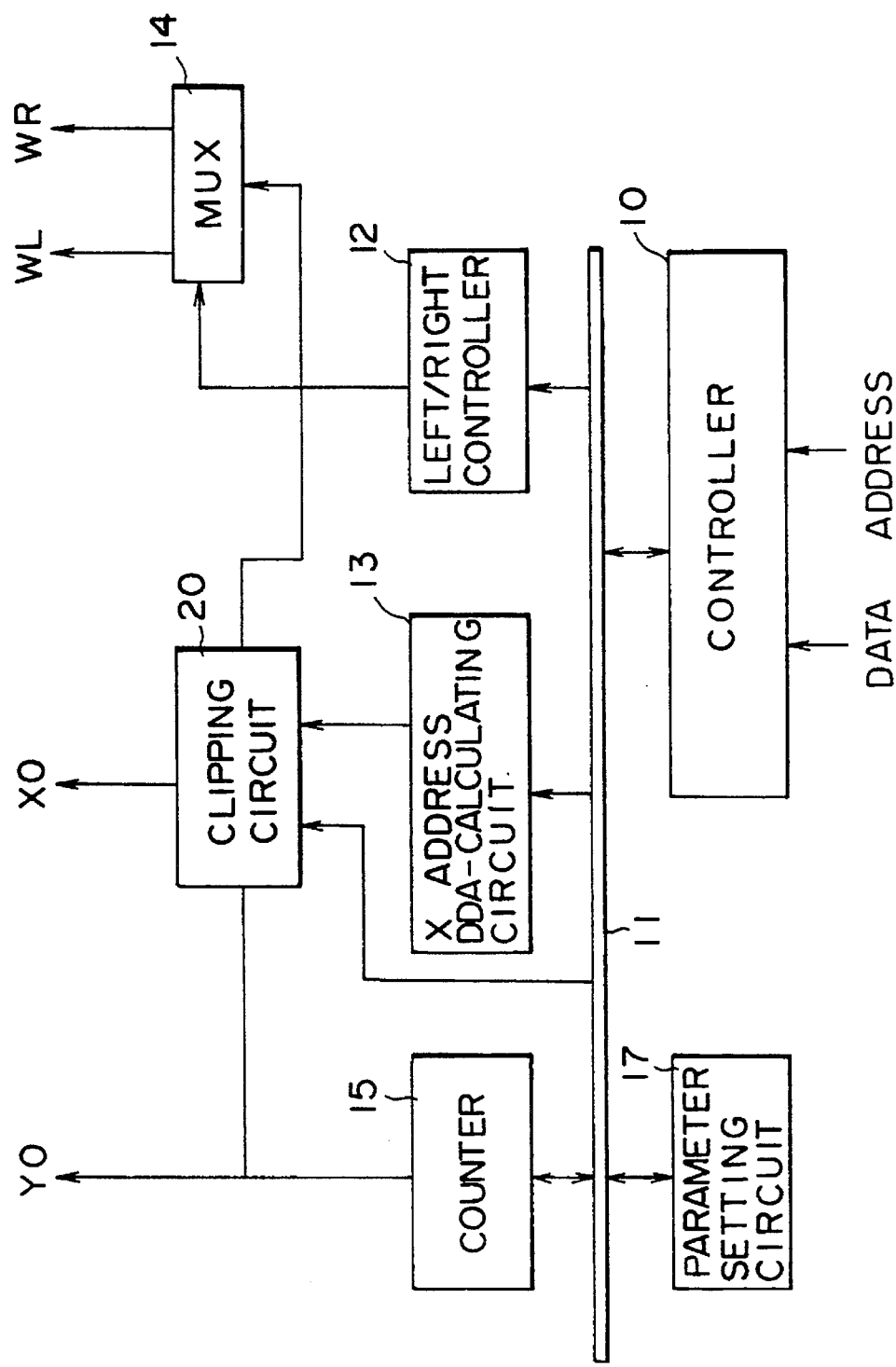
FIG. 38 is a block diagram showing a main portion of a polygonal image-drawing processor in accordance with a third embodiment of the present invention.

FIG. 38 is a block diagram showing a main portion of the polygonal image-drawing processor in this third embodiment.

In the third embodiment, a clipping processing circuit is further added to the polygonal image-drawing processor in the first embodiment. The other constructional portions of the polygonal image-drawing processor in the third embodiment are similar to those shown in FIG. 7.

Similar to the first embodiment, data in an unillustrated image memory are formatted and a Y address corresponds to a horizontal scanning line. In this format, values of X addresses at a left-handed intersection point (XL) and a right-handed intersection point (XR) of each of polygons 1 to n are written to Y addresses from 1 to 400 corresponding to scanning lines from 1 to 400. The left-handed intersection point (XL) shows an image-drawing starting point X-address on a scanning line. The right-handed intersection point (XR) shows an image-drawing terminal point X-address on this scanning line.

As mentioned above, this image memory is formatted such that only intersection point information and color information on each of sides of each of polygons 1 to n are written to this image memory. Accordingly, an amount of the written information is reduced and it is possible to cope with a writing operation of the written information by a memory having a small capacity. Further, an amount of information read out of the memory can be reduced so that no memory having a high reading speed is required.

The polygonal image-drawing processor in the third embodiment will next be described in detail with reference to FIG. 38.

Figure 39:
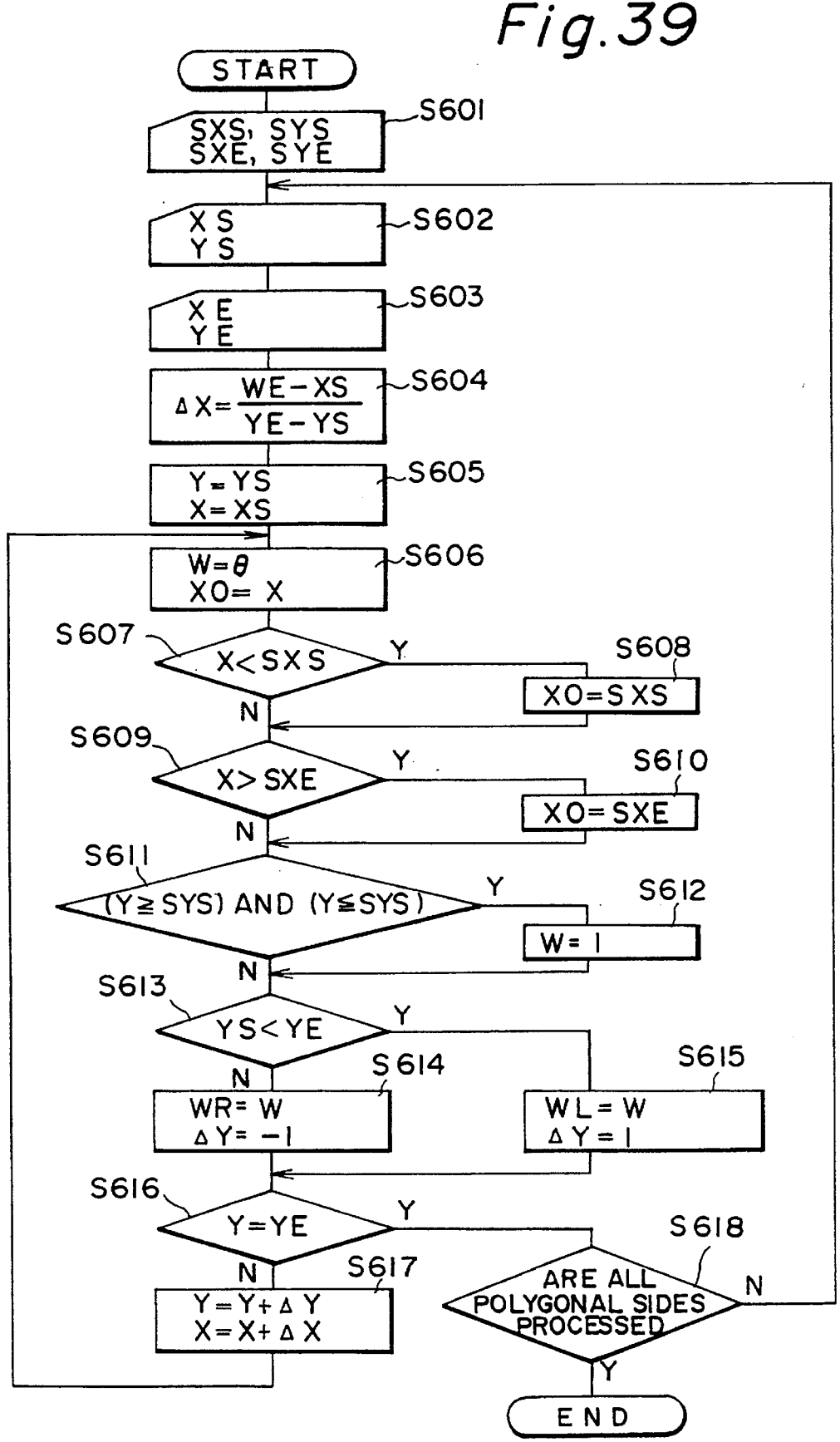
FIG. 39 is a flow chart for explaining an operation of the polygonal image-drawing processor in the third embodiment of the present invention.

A controller 10 controls operations of the following constructional portions in accordance with the flow chart shown in FIG. 39. Polygonal data and address information are transmitted to this controller 10. The information transmitted to the controller 10 are constructed by two-end point information of X and Y and side information indicative of the right-handed or left-handed rotation of a polygon as shown in FIGS. 9a and 9b. A linear directional vector (DIR) constituting the polygon on each of polygonal sides is calculated on the basis of the end point information and the side information of the polygon.

The linear directional vector (DIR) shown in FIG. 8 is calculated and information about this linear directional vector (DIR) is transmitted to a left/right controller 12 through a bus 11.

The left/right controller 12 judges whether the given linear directional vector (DIR) is located on a right-handed or left-handed side in accordance with the above-mentioned Table 3. Thus, the linear directional vector is divided into two side groups.

The left-handed intersection point (XL) and the right-handed intersection point (XR) in a writing region of the image memory are controlled on the basis of the divided right-handed or left-handed side.

An X address DDA-calculating circuit 13 calculates an X address on each of the polygonal sides by a digital differential analysis (DDA). The X address DDA-calculating circuit 13 makes the digital differential analysis from values of X and Y coordinates at starting and terminal points on the polygonal sides with respect to each of dots between end points thereof. Values of the Y and X addresses are outputted from the X address DDA-calculating circuit 13 to a multiplexer 14.

An operation of the multiplexer 14 is control led by the left/right control let 12. The value of the X address from the X address DDA-calculating circuit 13 is written by this multiplexer 14 to one of writing regions of the image memory 5 for the intersection points (XR) and (XL).

A counter i5 counts the number of polygons with respect to the Y address. A register 5 latches an output of the counter 15. Information with respect to an intersection point I0 of the polygon is transmitted from this register to the image memory 5 by the output of the counter 15.

A parameter setting circuit 17 calculates parameters required in each block of the digital differential analysis based on addresses at a starting point (XC1, YC1) and a terminal point (XC2, YC2) constituting end points on each of the polygonal sides.

X and Y starting points (SXS,SYS), and X and Y terminal points (SXE,SYE) on the screen are set by the controller 10. A clipping circuit 20 receives the X address value calculated by the X address DDA-calculating circuit 13 and receives a Y address value of the counter 15. The clipping circuit 20 then performs clipping processing with respect to the calculated X address value and the Y address value of the counter 15. The clipping circuit 20 outputs an X address value after this clipping processing and further outputs a write signal to the multiplexer 14.

An operation of the polygonal image-drawing processor in the third embodiment will next be described with reference to the flow chart shown in FIG. 39.

In a step S601, the controller 10 sets an X starting point (SXS) at X and Y coordinates on the screen to an SXS register in the clipping circuit 20. The controller 10 also sets a Y starting point (SYS) at X and Y coordinates on the screen to an SYS register in the clipping circuit 20. The controller 10 also sets an X terminal point (SXE) at X and Y coordinates on the screen to an SXE register in the clipping circuit 20. The controller 10 further sets a Y terminal point (SYE) at X and Y coordinates on the screen to an SYE register in the clipping circuit 20.

Then, in a step S602, the controller 10 sets an X starting point on a polygonal side to an XS register in the parameter setting circuit 17. The controller 10 also sets a Y starting point on the polygonal side to a YS register in the parameter setting circuit 17.

In a step S603, the controller 10 sets an X terminal point on the polygonal side to an XE register in the parameter setting circuit 17. The controller 10 also sets a Y terminal point on the polygonal side to a YE register in the parameter setting circuit 17.

Thereafter, in a step S604, the parameter setting circuit 17 divides a difference between the registered values of the XE and XS registers by a difference between the registered values of the YE and YS registers. The divided results are set to an X-register.

In a step S605, the controller 10 sets the registered values of the XS register and the YS register in the parameter setting circuit 17 to a ΔX register in the X address DDA-calculating circuit 13 and a Y-register in the counter 15.

Thereafter, in a step S606, the clipping circuit 20 clears a write signal and the controller 10 transfers a registered value of an X-register in the X address DDA-calculating circuit 13 to an X0 register in the clipping circuit 20.

In a step S607, the clipping circuit 20 compares the registered value of the SXS register with the registered value of the X-register in the X address DDA-calculating circuit 13. When the registered value of the SXS register is greater than that of the X-register in the X address DDA-calculating circuit 13, it proceeds to a step S608. In the step S608, the registered value of the SXS register is transferred to the X0 register. In contrast to this, when the registered value of the SXS register is smaller than that of the X-register in the X address DDA-calculating circuit 13, it directly proceeds to a step S609 from the step S607.

In the step S609, the clipping circuit 20 compares the registered value of the SXE register with the registered value of the X-register in the X address DDA-calculating circuit 13. When the registered value of the SXE register is greater than that of the X-register in the X address DDA-calculating circuit 13, it proceeds to a step S610. in the step S610, the registered value of the SXE register is transferred to the X0 register. In contrast to this, when the registered value of the SXE register is smaller than that of the X-register in the X address DDA-calculating circuit 13, it directly proceeds to a step S611 from the step S609.

In the step S611, the clipping circuit 20 compares the registered value of the Y-register in the counter 15 with the registered value of the SYS register. When the registered value of the Y-register is greater than that of the SYS register and is smaller than the registered value of the SYE register, it proceeds to a step S612 in which the write signal (W-signal) is set to be active and is transmitted to the multiplexer 14.

In a step S613, when a side vector of a polygon is directed upward as shown in the above Table 3, the right/left controller 12 controls an operation of the multiplexer 14 in a step S614 such that the W-signal is switched to a WR signal and a flag ΔY of the controller 10 shows −1. In contrast to this, when the side vector is directed downward as shown in the above Table 3, the right/left controller 12 controls the operation of the multiplexer 14 in a step S615 such that the W-signal is switched to a WL signal and the flag ΔY of the controller 10 shows 1. The registered value of the X0 register is written to a Y0 address of a memory constructed as shown in FIG. 5 by setting the WR and WL signals to be active.

In a step S616, the controller 10 compares the registered value of the Y-register in the counter 15 with the registered value of the YE register in the parameter setting circuit 17.

When these registered values are not equal to each other, it proceeds to a step S617. In contrast to this, when these registered values are equal to each other, it proceeds to a step S618.

In the step S517, the X address DDA-calculating circuit 13 adds the registered value of the ΔX register to the registered value of the X-register, thereby updating the registered value of the X-register. An incremental operation of the counter 15 is performed if the registered value of a ΔY register in the controller 10 is positive. A decremental operation of the counter 15 is performed if the registered value of the ΔY register is negative. Then, it is returned to the step S606.

In the step S618, the controller 10 judges whether all polygonal sides are processed or not. When no polygonal sides are completely processed, it is returned to the step S602 and the above-mentioned operations are repeatedly performed. In contrast to this, if all the polygonal sides are completely processed, processing of one polygon is completed.

Figure 40:
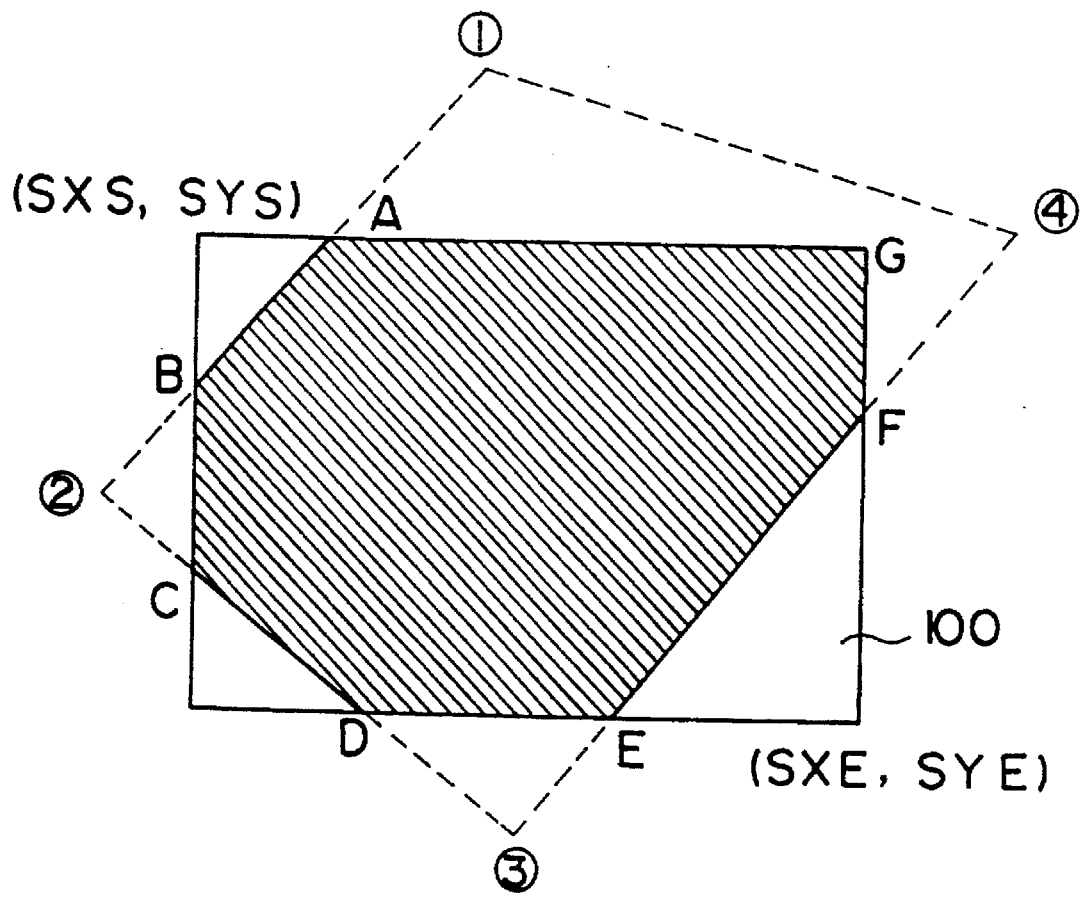
FIG. 40 is a typical view showing a clipping state of a polygon clipped in accordance with the third embodiment of the present invention.

FIG. 40 shows an executed example of the polygonal image-drawing processor in the third embodiment of the present invention.

A polygon shown in FIG. 40 is a square polygon having end points ① to ④. With respect to a polygonal side from point ① to point ②, no clipping circuit 20 allows a writing operation of the image memory from point ① to point A. The normal writing operation of the image memory is performed from point A to point B. The writing operation of the image memory is performed by changing the registered value of the X0 register to XS from point B to point ②.

With respect to a polygonal side from point ② to point ③, the clipping circuit 20 changes the registered value of the X0 register to XS and writes this changed XS value to the image memory from point ② to point C. The normal writing operation of the image memory is performed from point C to point D. No writing operation of the image memory is allowed from point D to point ③.

With respect to a polygonal side from point ③ to point ④, no clipping circuit 20 allows the writing operation of the image memory from point ③ to point E. The normal writing operation of the image memory is performed from point E to point F. The registered value of the X0 register is changed to an SXE value and this changed SXE value is written to the image memory from point F to point ④.

No clipping circuit 20 allows the writing operation of the image memory on a polygonal side from point ④ to point ①.

Thus, the polygon shown by points ① to ④ is clipped to a polygon shown by points A to G.

The above example is a clipping example, but a picking operation is similarly performed.

As mentioned above, clipping processing of three-dimensional graphics is simultaneously executed together with the calculation of X and Y addresses on polygonal sides so that concurrent processing can be performed when the polygonal image-drawing processor is constructed by hardware. Further, the polygonal image-drawing processor can be operated at a high speed and can be constructed by a small amount of hardware.

As mentioned above, in the present invention, respective polygonal sides are divided into left-handed and right-handed sides by the direction of a linear vector. Points on the respective polygonal sides are calculated and provided by the digital differential analysis every Y address. Values of X addresses on the left-handed and right-handed polygonal sides are stored to an image memory. Accordingly, it is sufficient to calculate and provide only the above points on the respective polygonal sides so that a capacity of the image memory can be reduced and a circuit structure can be made compact.

Further, no memory operated at a high speed is required and an image-drawing operation can be performed in 1/60 second with respect to one picture by using a dynamic random access memory (DRAM).

In the second embodiment of the present invention, a smooth shading operation can be easily performed since color information of red, green and blue are provided by the digital differential analysis between starting and terminal points on the polygonal sides in parallel with the digital differential analysis of X- and Y-coordinates at a polygonal edge.

In accordance with the third embodiment of the present invention, all X-addresses are set to X-starting point addresses on the screen at a calculating time of X and Y addresses on a polygonal side when X-address values are smaller than X-starting point values on the screen. In contrast to this, when the X-address values are greater than X-terminal point values on the screen, all the X-addresses are set to X-terminal point addresses on the screen. When a Y-address value is smaller than a Y-starting point or greater than a Y-terminal point value on the screen, a writing operation about this Y-address at the X-address starting and terminal points is stopped. Thus, it is possible to reduce a hardware amount and process an image at a high speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A polygonal image-drawing processor comprising:

a device for providing a direction of a linear vector on each of sides constituting a polygon based on information about two end points and side information of the polygon, said direction of the linear vector being selected from eight directions defined in advance;

a device for dividing each of the sides constituting the polygon into two groups of right-handed and left-handed sides in accordance with the provided direction of the linear vector and the side information of the polygon;

a device for calculating an X address of an intersection point of each of the sides constituting the polygon with a horizontal scanning line by a digital differential analysis at every Y address, said digital differential analysis calculating said X address from the information about two end points and the provided direction of the linear vector on the basis of Bresenham algorithm;

a device for controlling the operation of an image memory so as to write X and Y addresses of a left-handed intersection point as an image-drawing starting point of the polygon on the horizontal scanning line and a right-handed intersection point as an image-drawing terminal point of the polygon on the horizontal scanning line respectively in a writing region thereof corresponding to each of the divided two groups, said left-handed intersection point corresponding to an intersection point of the left-handed side with the horizontal scanning line, said right-handed intersection point corresponding to an intersection point of the right-handed side with the horizontal scanning line; and an image-drawing processing device for performing a coloring operation between the respective right-handed and left-handed sides based on the X and Y addresses written in the image memory so as to draw an image.

2. A polygonal image-drawing processor as claimed in claim 1, wherein the side information includes information showing a right-handed or left-handed rotation of the polygon.

3. A polygonal image-drawing processor comprising:

a device for providing a direction of a linear vector on each of sides constituting a polygon based on information about two end points and side information of the polygon, said direction of the linear vector being selected form eight directions defined in advance;

a device for dividing each of the sides constituting the polygon into two groups of right-handed and left-handed sides in accordance with the provided direction of the linear vector and the side information of the polygon;

a device for adding color information to said two end points and calculating an X address of an intersection point of each of the sides constituting the polygon with a horizontal scanning line together with the color information thereof by a digital differential analysis at every Y address, said digital differential analysis calculating said X address together with the color information thereof from the information about two end points, the added color information and the provided direction of the linear vector on the basis of Bresenham algorithm;

a device for controlling the operation of an image memory so as to write X and Y addresses of a left-handed intersection point as an image-drawing starting point of the polygon on the horizontal scanning line and of a right-handed intersection point as an image-drawing terminal point of the polygon on the horizontal scanning line respectively together with the color information in a writing region thereof corresponding to each of the divided two groups, said left-handed intersection point corresponding to an intersection point of the left-handed side with the horizontal scanning line, said right-handed intersection point corresponding to an intersection point of the right-handed side with the horizontal scanning line; and an image-drawing processing device for performing a coloring operation between the respective right-handed and left-handed sides based on the X and Y addresses and the color information written in the image memory so as to draw an image.

4. A polygonal image-drawing processor as claimed in claim 3, wherein the side information includes information showing a right-handed or left-handed rotation of the polygon.

5. A polygonal image-drawing processor as claimed in claim 3, wherein color information of red, green and blue is provided by the digital differential analysis based on color information of the two end points on the polygon sides in parallel with digital differential analysis based on the X- and Y-coordinates at a polygonal edge.

6. A polygonal image-drawing processor comprising:

a device for providing a direction of a linear vector on each of sides constituting a polygon based on information about two end points and side information of the polygon, said direction of the linear vector being selected from eight directions defined in advance;

a device for dividing each of the polygonal sides into two groups of right-handed and left-handed sides in accordance with the provided direction of the linear vector and the side information of the polygon;

a device for calculating an X address of an intersection point of each of said polygonal sides with a horizontal scanning line by a digital differential analysis at every Y address, said digital differential analysis calculating said X address from the information about two end points and the provided direction of the linear vector on the basis of Bresenham algorithm; and a control device for comparing said calculated X addresses with addresses at an X-starting point, a Y-starting point, an X-terminal point and a Y-terminal point in a clipping region;

said control device changing an X-address or changing the X-address every Y-address; or said control device writing the X-starting and X-terminal point addresses every Y-address to an image memory.

7. A method of processing polygonal information to obtain an image for display comprising the steps of:

providing a direction of a linear vector on each of sides constituting a polygon based on information about two end points and side information of the polygon, said direction of the linear vector being selected from eight directions defined in advance;

dividing each of the sides constituting the polygon into two groups of right-handed and left-handed sides in accordance with the provided direction of the linear vector and the side information of the polygon;

calculating an X address in an intersection point of each of the sides constituting the polygon with a horizontal scanning line by a digital differential analysis at every Y address, said digital differential analysis calculating said X address from the information about two end points and the provided direction of the linear vector on the basis of Bresenham algorithm;

controlling the operation of an image memory so as to write X and Y addresses in a left-handed intersection point as an image-drawing starting point of the polygon on the horizontal scanning line and in a right-handed intersection point as an image-drawing terminal point of the polygon on the horizontal scanning line respectively in a writing region thereof corresponding to each of the divided two groups, said left-handed intersection point corresponding to an intersection point of the left-handed side with the horizontal scanning line, said right-handed intersection point corresponding to an intersection point of the right-handed side with the horizontal scanning line to the image memory; and performing a coloring operation between the respective right-handed and left-handed sides based on the X and Y addresses written in the image memory so as to draw an image.

* * * * *